United States Patent
Yang

(10) Patent No.: US 8,427,949 B2
(45) Date of Patent: Apr. 23, 2013

(54) SYSTEM AND METHOD FOR ADAPTING A SOURCE RATE

(75) Inventor: Yunsong Yang, San Diego, CA (US)

(73) Assignee: Future Wei Technologies, Inc., Plano, TX (US)

(*) Notice: Subject to any disclaimer, the term of this patent is extended or adjusted under 35 U.S.C. 154(b) by 331 days.

(21) Appl. No.: 12/850,460

(22) Filed: Aug. 4, 2010

(65) Prior Publication Data

US 2011/0032935 A1 Feb. 10, 2011

Related U.S. Application Data

(60) Provisional application No. 61/232,387, filed on Aug. 7, 2009.

(51) Int. Cl.
*H04J 1/16* (2006.01)
(52) U.S. Cl.
USPC .......................... 370/232; 370/229; 709/233
(58) Field of Classification Search .................. 370/229, 370/232, 235, 252, 329, 352; 709/233, 235, 709/228
See application file for complete search history.

(56) References Cited

U.S. PATENT DOCUMENTS

| | | | |
|---|---|---|---|
| 2002/0046264 A1* | 4/2002 | Dillon et al. ................... | 709/219 |
| 2004/0190449 A1* | 9/2004 | Mannal et al. ................. | 370/229 |
| 2004/0199659 A1* | 10/2004 | Ishikawa et al. .............. | 709/235 |
| 2007/0081454 A1* | 4/2007 | Bergamasco et al. ......... | 370/229 |
| 2008/0159129 A1* | 7/2008 | Songhurst et al. ............. | 370/229 |
| 2008/0186918 A1* | 8/2008 | Tinnakornsrisuphap et al. ............................. | 370/331 |
| 2008/0304413 A1* | 12/2008 | Briscoe et al. ................. | 370/235 |
| 2009/0037592 A1* | 2/2009 | Lyon .............................. | 709/228 |
| 2009/0180380 A1* | 7/2009 | Prabhakar et al. ............. | 370/232 |
| 2010/0054126 A1* | 3/2010 | Kwan et al. .................... | 370/235 |
| 2010/0177716 A1* | 7/2010 | Harada et al. .................. | 370/329 |
| 2010/0271946 A1* | 10/2010 | Davari et al. ................... | 370/232 |
| 2011/0182194 A1* | 7/2011 | Jacquet et al. ................. | 370/252 |

OTHER PUBLICATIONS

Ericsson, "Vocoder rate adaptation for LTE," 3GPP TSG-SA WG2 Meeting #74, S2-094304, Jul. 6-10, 2009, pp. 1-8, Sophia-Antipolis, France.
Ramakrishnan, K., et al., "The Addition of Explicit Congestion Notification (ECN) to IP," Network Working Group, RFC 3168, Sep. 2001, 55 pages.
Westerlund, M., et al., "Explicit Congestion Notification (ECN) for RTP over UDP draft-ietf-avtcore-ecn-for-rtp-00," Network Working Group, Jan. 28, 2011, 45 pages.

* cited by examiner

*Primary Examiner* — Hassan Phillips
*Assistant Examiner* — Ajay Cattungal
(74) *Attorney, Agent, or Firm* — Slater & Matsil, L.L.P.

(57) ABSTRACT

A system and method for adapting a source rate are provided. A method for operations at a communications device, where the communications device is a sender of information packets over a packet stream, includes determining a source rate of the packet stream, and marking information packets of the packet stream, where the information packets are marked with a first marking pattern if the source rate is equal to a minimum source rate, or the information packets are marked with a second marking pattern if the source rate is greater than the minimum source rate. The first marking pattern has a period of M information packets, where M is a positive integer value greater than or equal to two, and the second marking pattern has a period of M information packets. The method also includes transmitting the marked information packets over the packet stream to a receiver.

26 Claims, 16 Drawing Sheets

SYSTEM AND METHOD FOR ADAPTING A SOURCE RATE

This application claims the benefit of U.S. Provisional Application No. 61/232,387, filed on Aug. 7, 2009, entitled "Method and Apparatus for Adapting a Source Rate Based on Explicit Congestion Notification in a Wireless Communications System," which application is hereby incorporated herein by reference.

TECHNICAL FIELD

The present invention relates generally to a system and method for wireless communications, and more particularly to a system and method for adapting a source rate.

BACKGROUND

For voice application, there are certain hours during a business day when the voice traffic load is much heavier than the average. In order to handle the peak voice traffic load without additional radio spectrum, some network operators would like to introduce coder/decoder (CODEC) adaptation based on the load condition at the radio access network (RAN) so that, when experiencing congestion during the peak hours, an enhanced Node B (eNB), which is also known as the base station, base terminal station, controller, and so forth, can indicate to a User Equipment (UE), which is also known as mobile station, terminal, subscriber, and so on, to select a more radio resource friendly CODEC rate for voice over Internet Protocol (VoIP) applications. Thus, more voice calls may be admitted during the peak hours with the trade-off of slight degradation in voice quality.

In its technical specification Request for Comments (RFC) 3168, titled "The Addition of Explicit Congestion Notification (ECN) to IP", the Internet Engineering Task Force (IETF) has specified two bits in the Internet Protocol (IP) header of an IP packet for providing explicit congestion notification (ECN). These two ECN bits can be used to indicate four codepoints as shown in the Table 1 below.

TABLE 1

| Value | Name |
|---|---|
| 00 | Not-ECT (not ECN Capable Transport) |
| 01 | ECT(0) (ECN Capable Transport (0)) |
| 10 | ECT(1) (ECN Capable Transport (1)) |
| 11 | CE (Congestion Experienced) |

The ECN-Capable Transport (ECT) codepoints '01' and '10', which are also known as ECT(0) and ECT(1) respectively, are set by the data sender to indicate that the end-points of the transport protocol are ECN-capable. The phrase "the ECT codepoint" in this invention refers to either of the two ECT codepoints. Any intermediate network node, such as a router, treats the ECT(0) and ECT(1) codepoints as equivalent. Senders are free to use either the ECT(0) or the ECT(1) codepoint to indicate ECT, on a packet-by-packet basis. The Not-ECT codepoint '00' indicates a packet that is not using ECN. The CE codepoint '11' is set by an intermediate node to indicate congestion to the endpoints.

In RFC 3168, the IETF has further specified two bits in the Transmission Control Protocol (TCP) header, namely ECN-Echo (ECE) and Congestion Window Reduced (CWR), to perform the handshakes for negotiating the usage of ECN between the endpoints during the setup of a TCP connection to determine if they are both ECN-capable. The ECE bit is further used by the data receiver to inform the data sender that a CE-marked packet has been receiver. The CWR bit is further used by the data sender to inform the data receiver that the congestion window has been reduced.

SUMMARY OF THE INVENTION

These and other problems are generally solved or circumvented, and technical advantages are generally achieved, by preferred embodiments of the present invention which provide a system and method for adapting a source rate In accordance with a preferred embodiment of the present invention, a method for operations at a communications device is provided. The communications device is a sender of information packets over a packet stream. The method includes determining a source rate of the packet stream, marking information packets of the packet stream, and wherein transmitting the marked information packets over the packet stream to a receiver. The information packets are marked with a first marking pattern if the source rate is equal to a minimum source rate, or the information packets are marked with a second marking pattern if the source rate is greater than the minimum source rate. The first marking pattern has a period of M information packets, where M is a positive integer value greater than or equal to two, and the second marking pattern has a period of M information packets.

In accordance with another preferred embodiment of the present invention, a method for operations at a communications controller is provided. The method includes receiving information packets from a packet stream, determining congestion conditions at the communications controller, determining a marking pattern for the packet stream, and determining if the marking pattern is equal to a rate-reduction-allowed marking pattern. The rate-reduction-allowed marking pattern has a period of M information packets, where M is a positive integer value greater than or equal to two. The method also includes if the communications controller is not experiencing congestion, transmitting the information packets over the packet stream to the receiver, and if the communications controller is experiencing congestion and the marking pattern is not equal to the rate-reduction-allowed marking pattern, transmitting the information packets over the packet stream to a receiver. The method further includes if the communications controller is experiencing congestion and the marking pattern is equal to the rate-reduction-allowed marking pattern, marking at least one packet stream marked with the rate-reduction-allowed marking pattern with a rate-reduction-requested marking pattern, and transmitting information packets of the at least one packet stream marked with the rate-reduction requested marking pattern to the at least one packet stream's receiver.

In accordance with another preferred embodiment of the present invention, a method for operations at a communications device is provided. The communications device is a receiver of information packets over a packet stream. The method includes receiving information packets from a packet stream, determining a source rate of the packet stream from the received information packets, and determining a marking pattern of the packet stream. The marking pattern has a period of M information packets, where M is a positive integer value greater than or equal to two. The method also includes transmitting a signal to a source of the information packets. The signal is based on the marking pattern of the packet stream and the source rate of the packet stream.

An advantage of an embodiment is that eNBs know when their UEs are already using a minimum CODEC rate. Knowledge of which UEs may be capable of further decreasing their CODEC rates may help to reduce overhead when the eNB attempts to reduce bandwidth consumption.

A further advantage of an embodiment is that UEs may be able to increase their CODEC rate through the use of several mechanisms to request an increase in CODEC rate when channel conditions improve or the number of users decreases. Increasing the CODEC rate may allow for an improvement in the quality of the user experience when communications system conditions permit.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 13a is a diagram of a UE;

FIG. 13b is a diagram of a typical protocol stack implemented in an application processor as shown in FIG. 13a;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a 3GPP LTE compliant communications system. The invention may also be applied, however, to other communications systems, such as those that are 3GPP LTE-Advance, WiMAX, and so forth, compliant.

Figure 1:
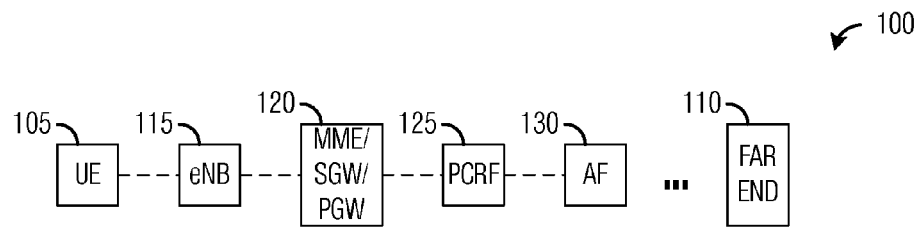
FIG. 1 is a diagram of network components in a communications system.

FIG. 1 illustrates network components in a communications system 100. Network components that may be involved in a connection between a UE 105 and a far end device 110 are shown. The connection may have originated at UE 105 and terminated at far end device 110 or originated at far end device 110 and terminated at UE 105.

Other network components involved in the connection include an eNB 115, a mobility management entity (MME)/serving gateway (SGW)/packet data network gateway (PGW) 120, a policy control and charging rules function (PCRF) 125, and an application function (AF) 130.

As discussed previously, eNB 115 may be used to provide transportation of data and signaling to UE 105. In general, eNB 115 may be responsible for controlling incoming and outgoing transmissions to and from UE 105. MME/SGW/PGW 120 may be separate entities but may also be implemented as a single unit depending on communications system architecture. MME may be used to initiate paging and authenticating of UE 105, as well as maintaining location information of UE 105. SGW may be used to route and forward user data (usually in the form of packets) for UE 105. SGW may also be used as a mobility anchor during handovers. PGW may be used to provide UE 105 connectivity to external packet data networks. PGW may serve as a point of entry and exit of traffic to and from UE 105. PCRF 125 may be used to detect service flow, enforce charging function, and so forth, in communications system 100. AF 130 may be used to provide dynamic policy or charging control.

eNB 115, MME/SGW/PGW 120, PCRF 125, and AF 130 shown in FIG. 1 may be associated with UE 105. To maintain simplicity, network components serving similar function to those shown in FIG. 1 but associated with far end device 110 but are not shown.

Figure 2:
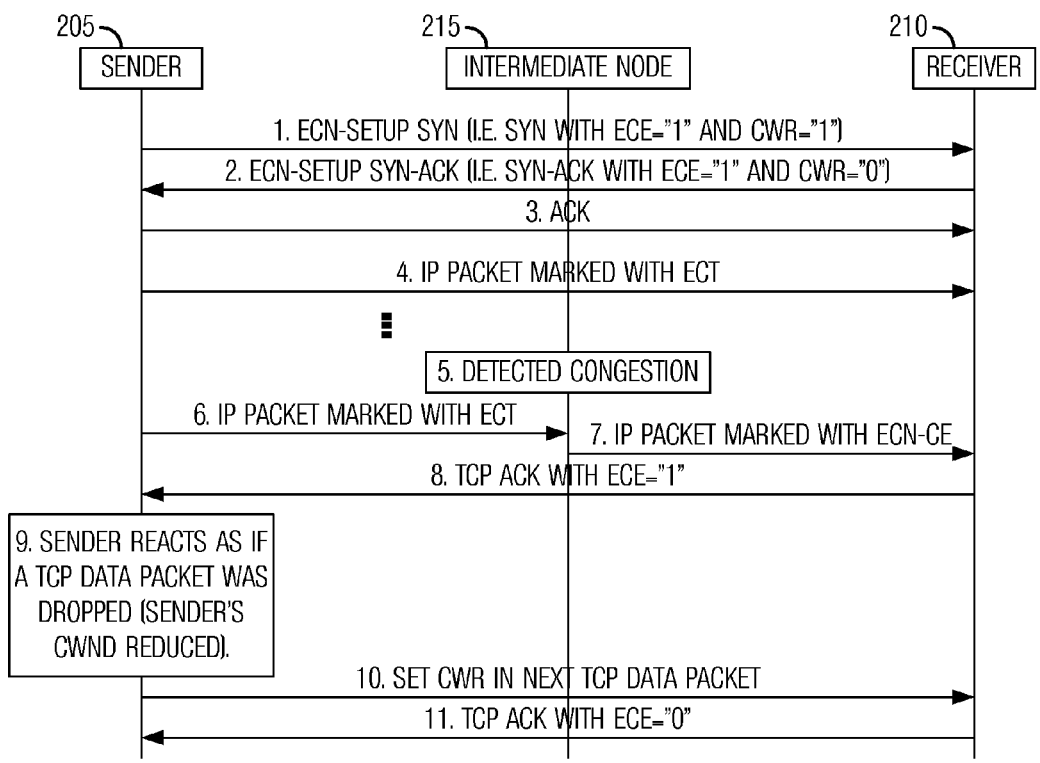
FIG. 2 is a diagram of an example of a TCP data flow when using a prior art ECN technique.

FIG. 2 illustrates an example of a TCP data flow when using a prior art ECN technique. At the beginning of a TCP connection setup, a sender 205 sends a TCP ECN-setup SYN packet, i.e. a TCP SYN packet with ECE="1" and CWR="1", to a receiver 210 to indicate that sender 205 is ECN-capable (shown as step #1). If receiver 210 is also ECN-capable, receiver 210 sends a TCP ECN-setup SYN-ACK packet, i.e. a TCP SYN-ACK packet with ECE="1" and CWR="0", to sender 205 (shown as step #2). Sender 205 further acknowledges that by sending a TCP-ACK packet to receiver 210 (shown as step 3), thereby concluding the negotiation of the usage of ECN between the two endpoints.

In step #4, sender 205 starts to send TCP data packets marked with ECT in the IP headers. In step #5, an intermediate node 215 along the data path experiences congestion. Intermediate node 215, which is congested, receives a new TCP data packet with the IP header marked with ECT from sender 205 (shown as step #6) thus it changes the ECT mark in the received packet to the CE (or also known as ECN-CE) mark and sends it further to receiver 210 to indicate that congestion has been experienced along this data path (shown as step #7). In step #8, receiver 210 sends back a TCP-ACK packet with ECE="1" in the TCP header to acknowledge the reception of the TCP data packet and to indicate that congestion has been experienced along this data path.

In step #9, sender 205 reacts to the explicit congestion notification received as if a TCP data packet has been dropped by performing certain congestion control procedures including reducing a congestion window size. In step #10, sender 205 sends the next TCP data packet to receiver 210 with CWR="1" in the TCP header to indicate that sender 205 has reduced the congestion window (CWND) size. In step #11, receiver 210 sends back a TCP-ACK with ECE="0" in the TCP header unless the congestion persists.

A real-time application such as VoIP usually uses real-time protocol (RTP) over user datagram protocol (UDP) over IP instead of using TCP over IP. Thus in order to use ECN for congestion control over an RTP-based application, a new handshake mechanism for usage negotiation and congestion feedback is needed. The third generation partnership project (3GPP) has received contributions for CODEC adaptation for VoIP based on the two ECN bits in the IP header.

Figure 3:
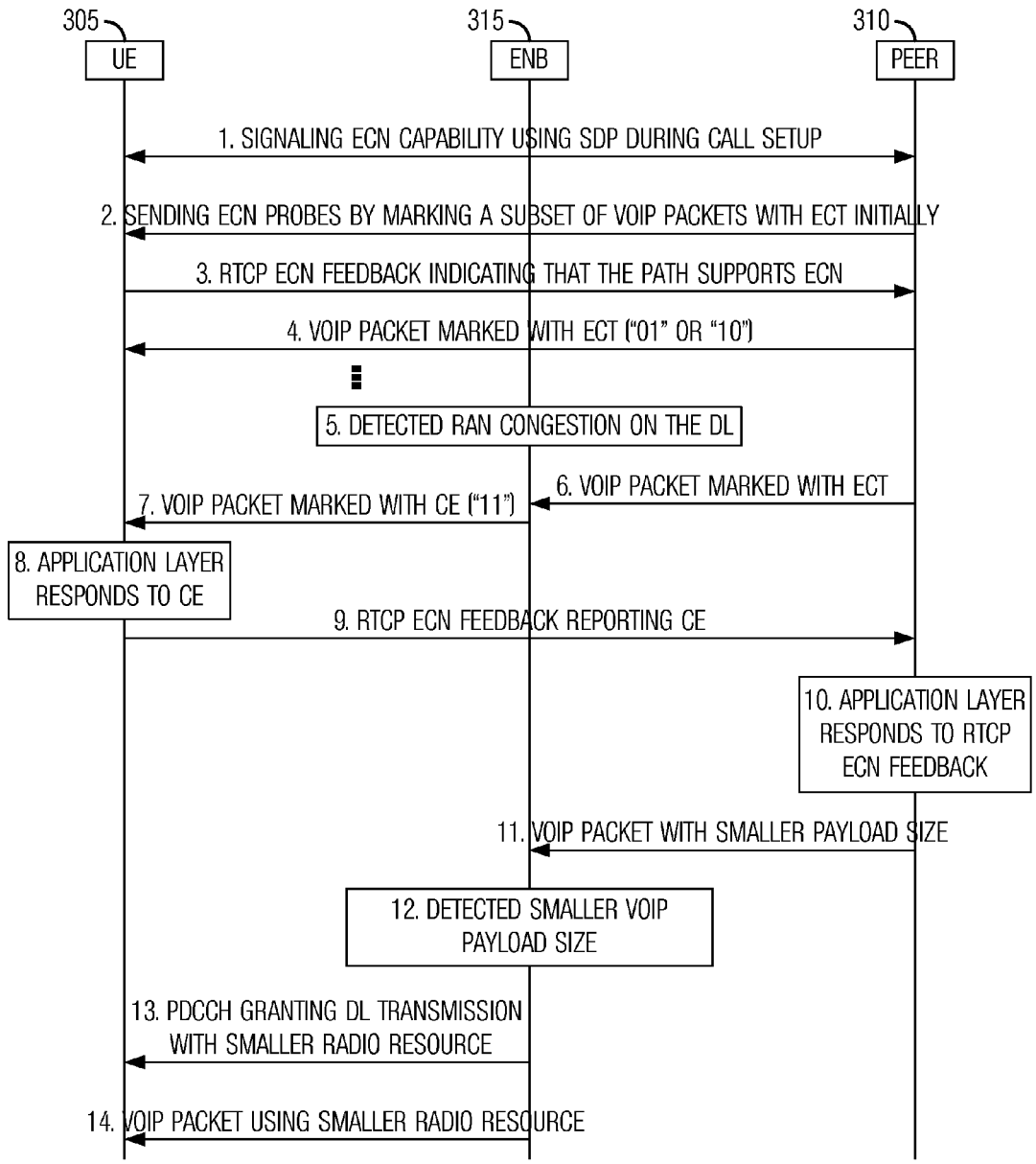
FIG. 3 is a diagram of an example of a VoIP call flow with downlink (DL) congestion control using a prior art technique with ECN bits.

FIG. 3 illustrates an example of a VoIP call flow with downlink (DL) congestion control using a prior art technique with ECN bits. As shown in FIG. 3, UE 305 is a receiver of the VoIP packets on the DL. Peer 310, which may be a UE or an intermediate multimedia entity such as a media gateway, is a sender of the VoIP packets. In step #1 UE 305 negotiates the use of ECN bits for Codec adaptation with its peer using session initiation protocol (SIP) signaling at the call setup. In step #2, peer 310 sends ECN probes by marking a subset of initial VoIP packets with ECT while marking the remaining initial VoIP packets with Not-ECT. In step #3, UE 305 sends an RTCP ECN Feedback message indicating that the path supports ECN. In step #4, peer 310 starts to mark all VoIP packets to UE 305 with ECT.

In step #5, eNB 315 that serves UE 305 detects congestion on its DL. In step #6, eNB 315 receives more VoIP packet marked with ECT and targeted for UE 305 from peer 310. Steps #5 and #6 may also occur in reverse order. eNB 315 changes the ECT mark in the VoIP packet to the CE mark to indicate the congestion at the radio access network (shown as step #7). In step #8, after receiving the VoIP packet with the CE mark in the IP header, an IP layer of UE 305 passes the congestion indication to an application layer, e.g., via socket application programming interface (API), for further response. In step #9, UE 305 sends an RTCP ECN feedback message to peer 310 to inform the congestion experienced on the DL.

In step #10, as a response to the RTCP ECN feedback message received, CODEC of peer 310 generates new VoIP packets at a lower CODEC rate, resulting in a smaller payload size for each new VoIP packet. In step #11, peer 310 sends the new VoIP packets with a smaller payload size. In step #12, eNB 315 detects the change of DL VoIP payload size. In step #13, eNB 315 sends a scheduling message, e.g., via the packet data control channel (PDCCH), to UE 305 to grant the DL (either semi-persistent scheduling—SPS or non-SPS) assignment with a smaller radio resource. In step #14, eNB 315 sends the new VoIP packet to UE 305 using a smaller radio resource thereby alleviating the congestion on the DL.

Figure 4:
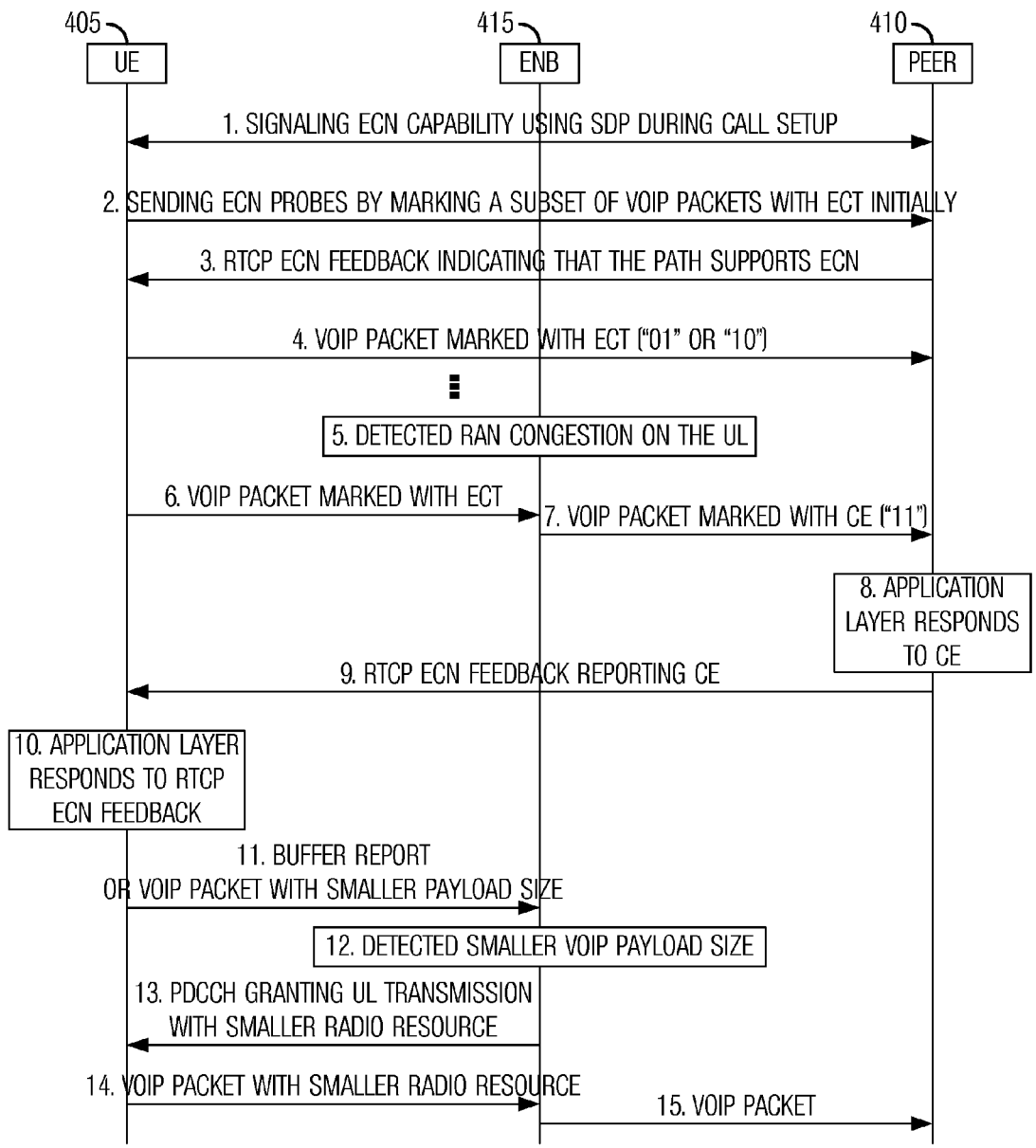
FIG. 4 is a diagram of an example of a VoIP call flow with uplink (UL) congestion control using a prior art technique with ECN bits.

FIG. 4 illustrates an example of a VoIP call flow with uplink (UL) congestion control using a prior art technique with ECN bits. In this example, UE 405 is a sender of the VoIP packets on the UL. Peer 410 is a receiver. In step #1 UE 405 negotiates the use of ECN bits for CODEC adaptation with peer 410 using SIP signaling at the call setup. In step #2, UE 405 sends ECN probes by marking a subset of initial VoIP packets with ECT. In step #3, peer 410 sends an RTCP ECN feedback message indicating that the path supports ECN. In step #4, UE 405 starts to mark all VoIP packets to peer 410 with ECT.

In step #5, eNB 415 that serves UE 405 detects congestion on its UL. In step #6, eNB 415 receives more VoIP packet marked with ECT and targeted for peer 410 from UE 405. Steps #5 and #6 may also occur in reverse order. eNB 415 changes the ECT mark in the VoIP packet to the CE mark to indicate the congestion at the radio access network (shown as step #7). In step #8, after receiving the VoIP packet with the CE mark in the IP header, an IP layer of peer 410 passes the congestion indication to an application layer for further response. In step #9, peer 410 sends an RTCP ECN feedback message to UE 405 to inform the congestion experienced on the UL.

In step #10, as a response to the RTCP ECN feedback message received, CODEC of UE 405 generates new VoIP packets at lower CODEC rate, resulting in a smaller payload size for each new VoIP packet. In step #11, UE 405 sends a new VoIP packet with a smaller payload size or a buffer status report to indicate so. In step #12, eNB 415 detects the change of UL VoIP payload size either via the received VoIP packet or the buffer status report from UE 405. In step #13, eNB 415 sends a scheduling message to UE 405 to grant the UL (either semi-persistent scheduling—SPS or non-SPS) assignment with a smaller radio resource. In step #14, UE 405 sends more VoIP packet to eNB 415 using a smaller radio resource thereby alleviating the congestion on the UL. In step #15, eNB 415 sends the new VoIP packets to peer 410.

The prior art techniques provide an end-to-end scheme for DL and UL congestion control using ECN bits over an RTP stream, similar to schemes for TCP connections proposed in the IETF. However, enhancements to the prior art techniques discussed above may be possible.

As an example, when a congested source eNB needs to forward a pending CE-marked packet data convergence protocol (PDCP) service data unit (SDU), a form of IP packet, to a target eNB due to a handoff, the source eNB may pass on the CE mark, which the source eNB sets, to the target eNB. The target eNB may faithfully send the CE marked PDCP SDU to a UE even if the target eNB is not itself congested.

Since the target eNB may not be able to tell who marked the IP packet with the CE mark nor what an original ECT mark was, the target eNB can only forward the IP packet unchanged. Therefore, the UE, after the handoff, reports the CE event by sending an RTCP ECN feedback message to the sender, thereby downgrading the CODEC rate (e.g., voice quality) unnecessarily when the target eNB is not congested and incurring an unnecessary RTCP ECN feedback message overhead. Since a handoff is perceived as one way to offload a congested eNB, it may be important to avoid undesirable consequences such as described above.

According to an embodiment, a source eNB memorizes the originally received ECT mark on an RTP packet that is target for a UE before changing the ECT mark to the CE mark due to congestion control, at least when the handoff preparation has been initiated for the UE. The eNB changes the CE mark back to the memorized original ECT mark when forwarding a pending CE-marked PDCP SDU to the target eNB due to the handoff.

As another example, a claimed benefit of ECN based CODEC rate adaptation may be that the eNB can carry out congestion control in a dedicated manner, i.e., reducing the CODEC rate for one or a few selected RTP streams at a time, instead of using a flooding approach by broadcasting congestion information to all UEs that are served by the eNB and are running VoIP applications, for example, and having all of the UEs respond in unison.

The dedicated approach requires that the eNB knows that the selected RTP stream(s) will definitely respond to the CE mark. However, a selected RTP stream may not respond to the CE mark because that the CODEC rate has already reached a limit for rate reduction, e.g., there is no frame redundancy, frame aggregation limit is reached, and a lowest supported CODEC rate that has been negotiated at call setup is already being used.

The prior art techniques discussed previously may not include a mechanism to inform the eNB that the CODEC rate has reached the limit for rate reduction. Since the eNB may be application agnostic, taking a trial-and-error approach to select a RTP stream for congestion control at the eNB may result in a mis-calculation, which may cause prolonged delay in admitting or denying a new connection (a VoIP call, for example) due to a long round-trip feedback delay, or a larger headroom in a reserved radio resource may be needed for running an admission control algorithm.

Instead of detecting and responding to a single IP packet with or without the CE mark (or Not-ECT mark, etc.), multiple IP packets and corresponding patterns of CE/Not-ECT/ECT marks may be used to detect and respond to network congestion. A pattern spread over multiple IP packets may be described as having a period that is equal to the number of IP packets. For example, if a pattern is spread over M IP packets, where M is a positive integer value greater than or equal to two, then the pattern may be said to have a period of M. As an example, groups of two IP packets may be used to detect an occurrence of a particular condition. Alternatively, instead of detecting an exact sequence of CE/Not-ECT/ECT marks in two or more IP packets, a distribution of CE/Not-ECT/ECT marks over a number of IP packets may be used to detect an occurrence of a particular condition.

As an example, an alternating sequence of IP packets marked with ECT marks (i.e., either "01" or "10") and Not-ECT mark (i.e., "00") may be used to indicate that a sender of the IP packets has reached a minimum rate in its set of supported CODEC rates that have been negotiated. Alternatively, a 50-50 distribution of ECT marks and Not-ECT mark over a number of IP packets may also indicate that a sender of the IP packets has reached a minimum rate in its set of supported CODEC rates. A detailed discussion of particular patterns and/or distributions is presented below.

The embodiments describe various techniques for improving CODEC rate adaptation using ECN bits through the use of marking patterns of the ECN bits of multiple packets. At least one of the marking patterns comprises at least two different types of ECN marks. In order to preserve the benefits of having two different ECT codepoints, such as verifying an end-to-end path or detecting a cheating receiver, a sender may still be able to randomly use ECT(0) and ECT(1) codepoints that are considered to be a single type of ECN mark (i.e., the ECT mark) for the purposes of using ECN marking patterns in subsequent descriptions and illustrations.

Therefore, there may be a total of three different ECN marks possible with the two ECN bits: namely a Not-ECT mark, an ECT mark, and a CE mark, that may be used to form marking patterns. Extensions may be possible to form additional marking patterns if the two ECT codepoints are considered to be two different ECN marks.

According to an embodiment, a sender indicates to the eNB whether a source rate on an RTP stream is at the lowest supported source rate that has been negotiated or not by using different packet-by-packet marking patterns on the ECN bits of a plurality of consecutive RTP packets that the sender sends to a receiver. Such an indication provides the eNB with the information of which RTP streams may respond to a request for further rate reduction and which may not. Thus, when experiencing congestion, the eNB may select one or more RTP streams for subjecting to rate reduction only from those RTP streams that may respond to the request for rate reduction. As a result, the eNB may more precisely estimate the effects of the saving on the radio resource for the RTP streams that are selected for rate reduction, thereby minimizing the number of RTP streams that need to be selected for subjecting to rate reduction thereof quality degradation, and/or minimizing the headroom of the reserved radio resource for running the admission control algorithm.

The sender may determine whether there is still room for further reducing the source rate on an RTP stream by comparing the current source rate with the lowest source rate within a set of supported source rates that are negotiated between the sender and the receiver of the RTP stream during the call setup. The source may be an audio CODEC, a video CODEC, or other type of real-time application. The sender may further consider the frame redundancy and the frame aggregation formats of the RTP packet payload when determining whether there is still room for further reducing the source rate on an RTP stream.

When receiving a request for reducing the source rate, the sender may, for an example, respond first by reducing the frame redundancy, then by reducing the CODEC rate when the frame redundancy is 1 (meaning that there is no frame redundancy), then by increasing the frame aggregation when the CODEC rate is at the lowest supported CODEC rate that has been negotiated. In the discussion presented below, the CODEC rate may be presented as an only factor in the source rate to illustrate various novel techniques without limiting the scope or the spirit of the embodiments.

According to an embodiment, when the sender CODEC rate is not at the lowest supported rate negotiated for a particular RTP stream, the sender marks the two ECN bits in the IP header of every RTP packet of the RTP stream that it sends with the ECT mark by choosing randomly between the ECT(0) and the ECT(1) codepoints. This particular packet-by-packet marking pattern on the two ECN bits of a plurality of consecutive RTP packets may be referred to as the rate-reduction-allowed pattern.

However, when the sender CODEC rate is at the lowest supported rate that has been negotiated, the sender marks the two ECN bits in the 1st, 3rd, . . . , (2N−1)-th RTP packets with the Not-ECT codepoint "00" and marks the two ECN bits in the 2nd, 4th, . . . , 2N-th RTP packets with one of the two ECT codepoints "01" and "10" randomly, where N is an odd number. In other words, odd numbered RTP packets may be marked the Not-ECT codepoint "00" and the even numbered RTP packets may be randomly marked with one of the two ECT codepoints "01" and "10". Visually, the packet-by-packet alternating marking pattern between the Not-ECT mark and the ECT mark may have the appearance:

00 01 00 10 00 10 00 10 00 01 00 01 00 10 00 01 00 10 00 10 . . . .

The packet-by-packet alternating marking pattern between the Not-ECT mark and the ECT mark may be referred to as the rate-reduction-prohibited pattern. At a receiver or eNB, the rate-reduction-prohibited pattern may have the appearance of alternating Not-ECT and ECT marks or alternating Not-ECT and CE marks since the ECT markings may be changed to CE by an intermediate node.

It should be understood that other pre-designated alternating marking patterns among different types of ECN marks and/or with different ratio between different types of ECN marks are also possible without departing from the spirit and scope of the embodiments. Furthermore, although the discussion discloses that a first type of ECN mark of a marking pattern occurs prior to a second type of ECN mark of the marking pattern, an order of the ECN marks may be reversed. As an example, with the rate-reduction-prohibited pattern discussed above, the discussion discloses that the Not-ECT codepoint occurs prior to the ECT codepoint. However, an equivalent marking pattern may be the ECT codepoint occurring prior to the Not-ECT codepoint. Therefore, the discussion of a specific embodiment of a marking pattern should not be construed as being limiting to either the scope or the spirit of the embodiments.

Figure 5:
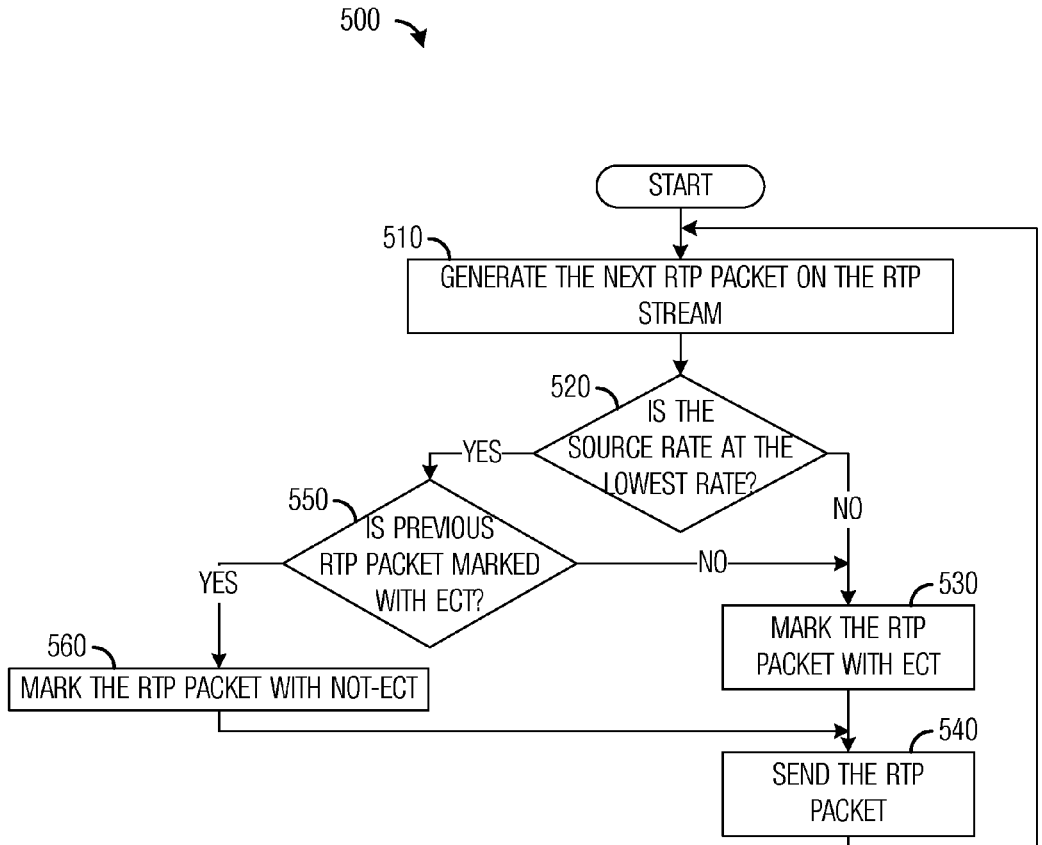
FIG. 5 is a flow diagram of sender operations for marking and sending an RTP packet.

FIG. 5 illustrates a flow diagram of sender operations 500 for marking and sending an RTP packet. Sender operations 500 may be indicative of operations occurring in a sender of an RTP packet. Sender operations 500 may occur when a sender, such as a UE or a server, has an RTP packet to send to a destination.

Referring to FIG. 5, the sender generates a new RTP packet of an RTP stream (block 510). The sender may then perform a check to determine if the source rate of the RTP packet is at the lowest source rate within a set of supported source rates that have been negotiated between the sender and a receiver during the call setup or not (block 520). If the source rate of the RTP packet is not at the lowest source rate within the set of supported source rates negotiated, the sender may mark the RTP packet with the ECT mark, e.g., by choosing randomly between the ECT(0) and the ECT(1) codepoints (block 530).

If the source rate of the RTP packet is at the lowest source rate within the set of supported source rates negotiated, the sender may further determine if a previous RTP packet of the RTP stream is sent with the ECT mark or not (block 550). If the previous RTP packet of the RTP stream is not sent with the ECT mark, the sender may mark the RTP packet with the ECT mark (block 530). If the previous RTP packet of the RTP stream is sent with the ECT mark, the sender may mark the RTP packet with the Not-ECT mark (block 560). The sender may then send the RTP packet (block 540).

It is understood that it is also possible to synchronize the Not-ECT mark and the ECT mark with the odd and even sequence numbers of the RTP packets, respectively, when the sender needs to send out RTP packets with the rate-reduction-prohibited pattern. In this case, the question to be asked and answered in block 550 is if the RTP sequence number of the RTP packet is odd or even, for example. If the RTP sequence number is odd, then the sender may mark the RTP packet with the Not-ECT mark, while if the RTP sequence number is even, then the sender may mark the RTP packet with one of the two ECT marks.

According to another embodiment, the eNB may react to an RTP packet received on an RTP stream based on the two ECN bits on the currently received RTP packet and the marking pattern observed on the two ECN bits on a plurality of currently and previously received RTP packets. Generally speaking, an eNB passes an RTP packet on without modifying the ECN bits if the eNB receives the RTP packet with the Not-ECT mark or the CE mark. Using the previously discussed example of the rate-reduction-allowed pattern and the rate-reduction-prohibited pattern that the sender may send out, if the eNB receives an RTP packet of an RTP stream with the ECT mark and the marking pattern on the ECN bits on the plurality of currently and previously received RTP packets of the RTP stream matches the rate-reduction-allowed pattern, the eNB may consider the RTP stream in question as a rate-reduction-allowed stream.

Therefore, when the eNB detects a congested condition at the radio access network, the eNB may consider the rate-reduction-allowed RTP stream as a candidate for reducing the source rate in its selection algorithm in response to the congested condition. Alternatively, if the eNB receives an RTP packet of an RTP stream with the ECT mark and the marking pattern on the ECN bits on the plurality of currently and previously received RTP packets of the RTP stream matches the rate-reduction-prohibited pattern, the eNB may consider the RTP stream as a rate-reduction-prohibited stream and may not consider it as a candidate for reducing the source rate when experiencing congestion, as the eNB knows that the sender will not be able to respond to a request for further reducing the source rate.

To an eNB, an alternating marking pattern that switches between the Not-ECT mark and the CE mark may also be a rate-reduction-prohibited pattern since an intermediate network node upstream along the path may change the ECT mark to the CE mark due to its own congested condition.

Figure 6:
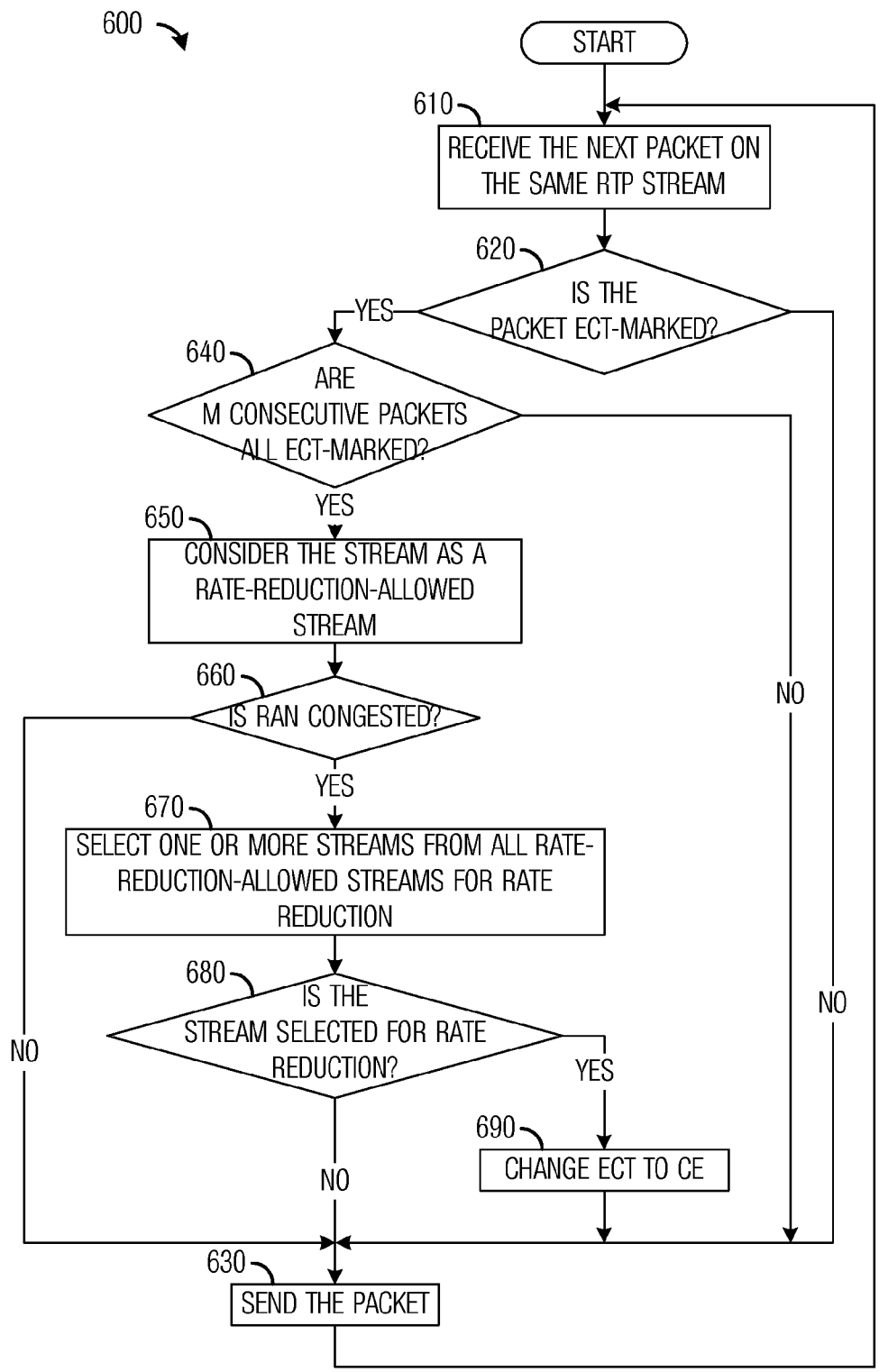
FIG. 6 is a flow diagram of eNB operations for receiving and sending an RTP packet.

FIG. 6 illustrates a flow diagram of eNB operations 600 for receiving and sending an RTP packet. eNB operations 600 may be indicative of operations occurring in an eNB serving a UE that is sending or receiving RTP packets. eNB operations 600 may occur when an eNB is receiving RTP packets to send to a UE or from a UE.

Referring to FIG. 6, the eNB receives a new RTP packet on a particular RTP stream (block 610). The eNB may determine if the RTP packet is received with the ECT mark or not (block 620). If the RTP packet is not received with the ECT mark, the eNB may send the RTP packet on towards its destination (block 630). If the RTP packet is received with the ECT mark, the eNB further determines if the current RTP packet and previous M−1 RTP packets (a total of M consecutive packets) received on the same RTP stream are received with the all-ECT marking pattern (i.e., the rate-reduction-allowed pattern) or not, where M is an integer number (block 640).

If the current RTP packet and previous M−1 RTP packets (a total of M consecutive packets) received on the same RTP stream are not received with the all-ECT marking pattern, the eNB sends the RTP packet on towards its destination (block 630). If the current RTP packet and previous M−1 RTP packets received on the same RTP stream are received with the all-ECT marking pattern, the eNB considers the RTP stream as a rate-reduction-allowed stream (block 650).

The eNB may further determine if the radio access network experiences a congested condition or not (block 660). If the radio access network does not experience a congested condition, the eNB sends the RTP packet on towards its destination (block 630). If the radio access network experiences a congested condition, the eNB selects one or more RTP streams from all rate-reduction-allowed streams for reducing the source rate (block 670).

The eNB may then determine if the RTP stream is selected for reducing the source rate or not (block 680). If the RTP stream is not selected for reducing the source rate, the eNB sends the RTP packet on towards its destination (block 630). If the RTP stream is selected for reducing the source rate, the eNB changes the ECT mark on the two ECN bits on the RTP packet to the CE mark (block 690). Additionally, the eNB may store the originally received ECT mark of the RTP packet, including which exact codepoint (either the ECT(0) and the ECT(1)) is received, in preparation for a possible handoff as described earlier. Then, the eNB sends the RTP packet on towards its destination (block 630).

According to yet another embodiment, a receiver of an RTP stream may react to an RTP packet received on the RTP stream based on the two ECN bits in the IP header of the currently received RTP packet, the marking pattern observed on the ECN bits on the plurality of currently and previously received RTP packets, the information of the current source rate in the RTP header of the currently received RTP packet, and the information of a set of supported source rates that has been negotiated between the sender and the receiver during the call setup. For example, by comparing the information of the current source rate and the set of supported source rates that has been negotiated, if the receiver determines that the current source rate is already at the lowest supported source rate that has been negotiated, the receiver does not need to send a feedback message to indicate the congestion to the sender, as the receiver knows that the sender will not be able to respond to a request for further reducing the source rate.

Figure 7:
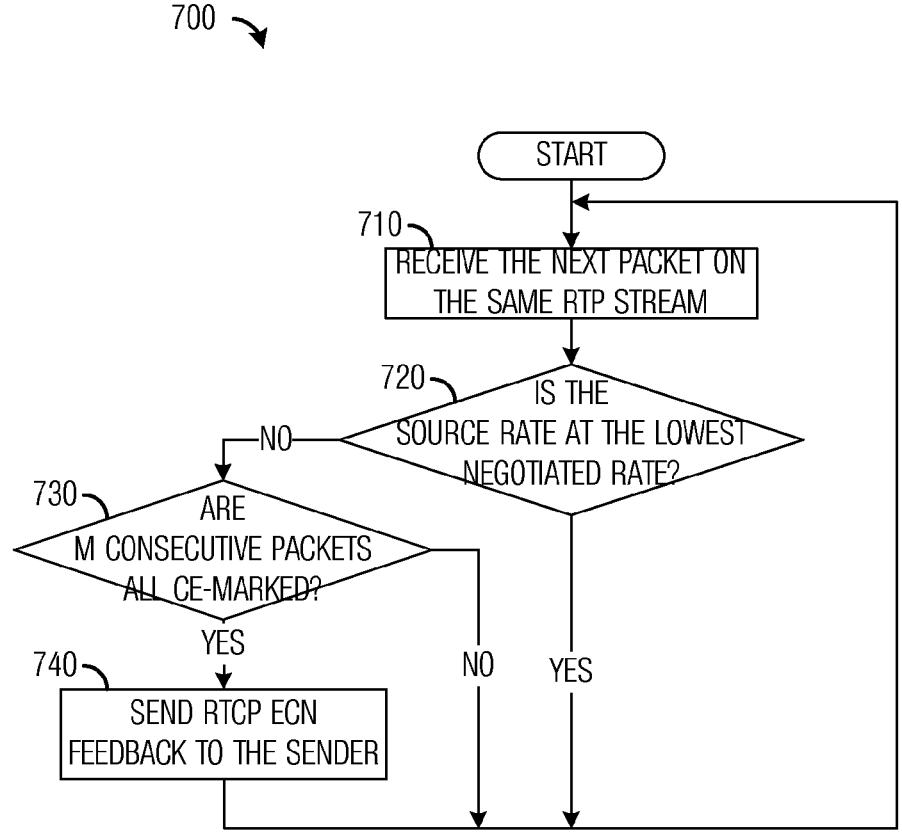
FIG. 7 is a flow diagram of receiver operations in responding to a received RTP packet.

FIG. 7 illustrates a flow diagram of receiver operations 700 in responding to a received RTP packet. Receiver operations 700 may be indicative of operations occurring in a receiver receiving RTP packets. Receiver operations 700 may occur while a receiver, e.g., a UE or a destination device, receives RTP packets sent by a source device.

Referring to FIG. 7, the receiver of a particular RTP stream receives a new RTP packet on the RTP stream (block 710). The receiver may determine if the current source rate of the RTP stream is at the lowest supported source rate that has been negotiated or not by comparing the information of the current source rate in the RTP header of the currently received RTP packet and the information of the set of supported source rates negotiated for the RTP stream (block 720). If the current source rate of the RTP stream is at the lowest supported source rate that has been negotiated, the receiver does not need to send a congestion feedback message to the sender. If the current source rate of the RTP stream is not at the lowest supported source rate that has been negotiated, the receiver may further determine if the current RTP packet and previous M−1 RTP packets (all M consecutive packets in total) received on the same RTP stream are marked with the all-CE marking pattern or not, where M is an integer number (block 730).

If current RTP packet and previous M−1 RTP packets (a total of M consecutive packets) received on the same RTP stream are not marked with the all-CE marking pattern, the receiver does not need to send a feedback to the sender. If current RTP packet and previous M−1 RTP packets received on the same RTP stream are marked with the all-CE marking pattern, the receiver sends a feedback message, such as a real-time control protocol (RTCP) ECN Feedback message, to the sender to report the congested condition experienced on the path in order to trigger the sender to reduce the source rate (block 740). With the use of the rate-reduction-prohibited pattern, the receiver does not send a feedback message to report the congested condition when a single RTP packet marked with the CE mark is received since an intermediate node may have replaced an ECT mark with a CE mark.

Therefore, based on the techniques described above, when the sender receives a feedback message with an indication of congestion experienced and/or with a request for reducing the source rate, the sender should have room for further reducing its source rate on the RTP stream. Thus, the sender should generate new RTP packets on the RTP stream at a lower source rate than before, which results in a smaller payload size on each new RTP packet. When the eNB receives the new RTP packets with a smaller payload size, a smaller radio resource may be assigned by the eNB for transmitting the new RTP packets over the radio link, thus helping to alleviate the congested condition experienced at the radio access network and/or making more radio resource available for admitting additional real-time services such as VoIP calls.

According to yet another embodiment, a method is provided for increasing the source rate of an RTP stream from the lowest supported source rate when the eNB detects that the radio access network is not congested. As described previously, when a sender of an RTP stream is at the lowest supported source rate that has been negotiated, the sender may send out RTP packets with the ECN bits alternating between the Not-ECT mark and the ECT mark, which is referred to as the rate-reduction-prohibited pattern.

To further enhance the techniques described above, the alternating marking pattern between the Not-ECT mark and the ECT mark is referred to as the rate-reduction-prohibited and rate-up-allowed pattern, which is also referred to as a first pattern. When an eNB observes the particular marking pattern (i.e., the rate-reduction-prohibited and rate-up-allowed pattern) on the plurality of currently and previously received RTP packets on an RTP stream, the eNB considers the RTP stream as a rate-up-allowed stream and also a rate-reduction-prohibited stream.

Then, if the eNB detects an un-congested condition at the radio access network, the eNB may select one or more RTP streams for increasing the source rate from all rate-up-allowed RTP streams. The eNB may send the received RTP packets of an RTP stream that is selected for increasing the source rate without changing the ECN bits on the RTP packets to indicate a request for increasing the source rate.

The eNB may further change the ECT mark on every other received RTP packets of a rate-up-allowed RTP stream that is not selected for increasing the source rate to the CE mark to indicate a request for keeping the current source rate on the un-selected rate-up-allowed RTP stream. Another eNB located downstream along the path may consider the alternating marking pattern between the Not-ECT mark and the CE mark as a rate-reduction-prohibited and rate-up-prohibited pattern, which is also know as a fourth pattern and indicates that at least one upstream node wishes to keep the source rate on the RTP stream at the lowest supported source rate that has been negotiated.

Therefore, when an eNB observes the rate-reduction-prohibited and rate-up-prohibited marking pattern on the plurality of currently and previously received RTP packets on an RTP stream, the eNB may send the received RTP packets of the RTP stream without changing the ECN bits on the RTP packets.

Figure 8:
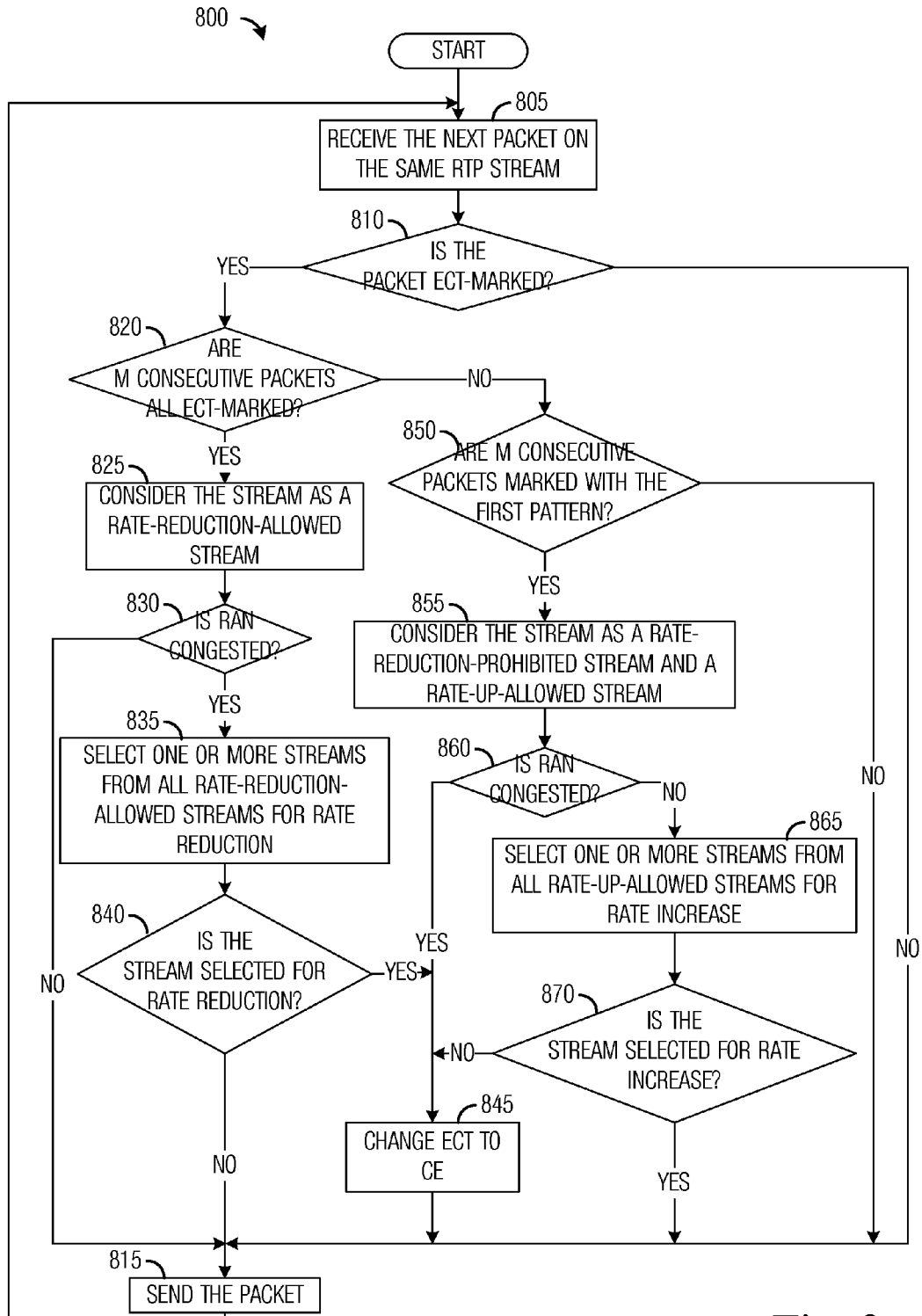
FIG. 8 is a flow diagram of eNB operations for receiving and forwarding an RTP packet with the enhancements allowing rate increase from the lowest rate.

FIG. 8 illustrates a flow diagram of eNB operations 800 for receiving and forwarding an RTP packet with the enhancements allowing rate increase from the lowest supported rate. eNB operations 800 may be indicative of operations occurring in an eNB serving a UE that is sending or receiving RTP packets. eNB operations 800 may occur when an eNB is receiving RTP packets to send to a UE or from a UE.

Referring to FIG. 8, the eNB receives a new RTP packet on a particular RTP stream (block 805). The eNB may determine if the RTP packet is received with the ECT mark or not (block 810). If the RTP packet is not received with the ECT mark, the eNB may send the RTP packet towards its destination (block 815). If the RTP packet is received with the ECT mark, the eNB may further determine if the current RTP and a previous M−1 RTP packets (a total of M consecutive packets) received on the same RTP stream are received with the all-ECT marking pattern, which is the rate-reduction-allowed pattern and is also know as the second pattern, where M is an integer number (block 820).

If the current RTP and a previous M−1 RTP packets (a total of M consecutive packets) received on the same RTP stream are received with the all-ECT marking pattern, the eNB may consider the RTP stream as a rate-reduction-allowed stream (block 825). The eNB may further determine if a congested condition is experienced at the radio access network or not (block 830). If a congested condition is not experienced at the radio access network, the eNB sends the RTP packet towards its destination (block 815). If a congested condition is experienced at the radio access network, in response to the congested condition the eNB selects one or more RTP streams from all rate-reduction-allowed RTP streams for reducing the source rate (block 835).

Then the eNB may further determine if the RTP stream is selected for reducing the source rate or not (block 840). If the RTP stream is not selected for reducing the source rate, the eNB sends the RTP packet towards its destination (block 815). If the RTP stream is selected for reducing the source rate, the eNB changes the ECT mark on the received RTP packet to the CE mark (block 845) prior to sending the RTP packet towards its destination (block 815).

If the eNB determined in block 820 that the current RTP packet and the previous M−1 RTP packets (a total of M consecutive packets) received on the same RTP stream are not received with the all-ECT marking pattern, the eNB may further determine if the current RTP packet and the previous M−1 RTP packets (a total of M consecutive packets) received on the same RTP stream are received with the first pattern (block 850). If the current RTP packet and the previous M−1 RTP packets (a total of M consecutive packets) received on the same RTP stream are not received with the first pattern, the eNB sends the RTP packet towards its destination (block 815). If the current RTP packet and the previous M−1 RTP packets (a total of M consecutive packets) received on the same RTP stream are received with the first pattern, the eNB may consider the RTP stream as a rate-up-allowed stream (block 855).

Then the eNB may further determine if a congested condition is experienced at the radio access network or not (block 860). If a congested condition is experienced at the radio access network, the eNB changes the ECT mark on the received RTP packet to the CE mark (block 845) before sending the RTP packet towards its destination (block 815). If a congested condition is not experienced at the radio access network, the eNB selects one or more RTP streams from all rate-up-allowed RTP stream for increasing the source rate (block 865).

Then the eNB may determine if the RTP stream is selected for increasing the source rate or not (block 870). If the RTP stream is selected for increasing the source rate, the eNB sends the RTP packet towards its destination (block 815). If the RTP stream is not selected for increasing the source rate, the eNB changes the ECT mark on the received RTP packet to the CE mark (block 845) before sending the RTP packet towards its destination (block 815).

If the receiver observes the alternating marking pattern between the Not-ECT mark and the CE mark, which is referred to as the rate-reduction-prohibited and rate-up-prohibited pattern (or the fourth pattern), on the plurality of currently and previously received RTP packets on an RTP stream, the receiver may consider that at least one upstream node along the path of the RTP stream wishes to keep the source rate at the lowest supported source rate that has been negotiated. Therefore the receiver does not need to send a congestion feedback message to the sender in response to the CE mark received on the every other RTP packets.

If the receiver observes the alternating marking pattern between the Not-ECT mark and the ECT mark, which is referred as the rate-reduction-prohibited and rate-up-allowed pattern (and is also known as the first pattern), on the plurality of currently and previously received RTP packets on an RTP stream, the receiver may consider that all upstream eNBs along the path of the RTP stream wish to increase the source rate and there is no congestion at any other intermediate node along the path. Therefore, the receiver may send a rate-up-switch signal to the sender to indicate a request for increasing the source rate.

The rate-up-switch signal may be a modified RTCP Receiver Report (RR) message as described in IETF RFC 3168 or a new RTCP ECN Feedback message. For a VoIP application using an Adaptive Multi-Rate (AMR) or AMR-Wideband (AMR-WB) CODEC, the receiver can also simply use the Codec Mode Request (CMR) field in the RTP payload header of the VoIP packet that is sent over the reverse direction to indicate a request for increasing the CODEC rate by setting the CMR field to the specific mode index corresponding to a desirable CODEC rate.

In order to avoid a source rate ping-pong, a slow start approach for rate-up-switch may be used, i.e., only allow source rate increases to occur in single source rate steps, except for the initial CODEC mode (ICM).

Figure 9:
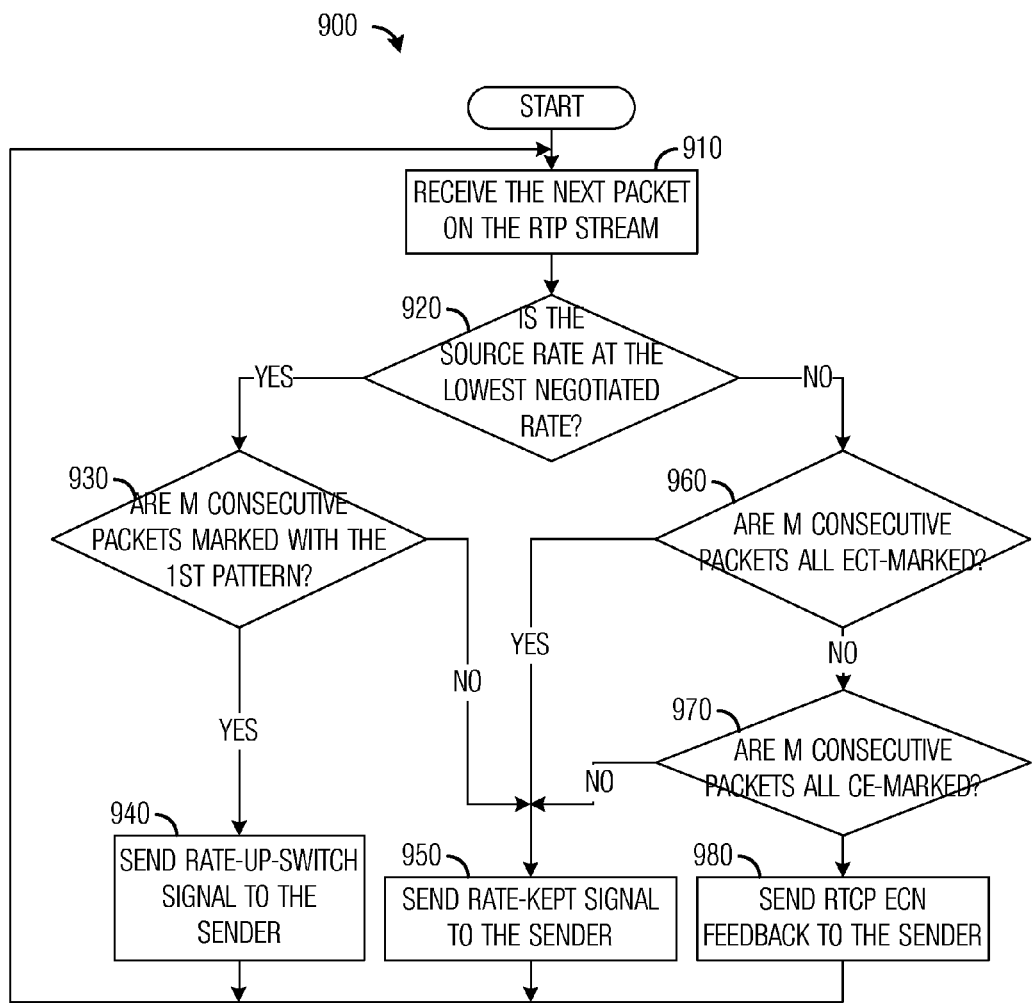
FIG. 9 is a flow diagram of receiver operations in responding to a received RTP packet with the enhancements allowing rate increase from the lowest rate.

FIG. 9 illustrates a flow diagram of receiver operations 900 in responding to a received RTP packet with the enhancements allowing rate increase from the lowest supported rate. Receiver operations 900 may be indicative of operations occurring in a receiver receiving RTP packets. Receiver operations 900 may occur while a receiver, e.g., a UE or a destination device, receives RTP packets sent by a source device.

Referring to FIG. 9, the receiver of a RTP stream receives a new RTP packet on the RTP stream (block 910). The receiver may determine if the current source rate of the RTP stream is at the lowest supported source rate that has been negotiated during the call setup or not by comparing the information of the current source rate in the RTP header of the currently received RTP packet and the information of the set of supported source rates negotiated for the RTP stream (block 920).

If the current source rate of the RTP stream is at the lowest supported source rate negotiated, the receiver may further determine if the current RTP packet and previous M−1 RTP packets (a total of M consecutive packets) received on the RTP stream are received with the first pattern or not (block 930). If the current RTP packet and previous M−1 RTP packets (a total of M consecutive packets) received on the RTP stream are received with the first pattern, the receiver may send a rate-up-switch signal to the sender to request for increasing the source rate (block 940). According to an embodiment, the rate-up-switch signal may be in the form of a modified RTCP RR message, a new RTCP ECN feedback message, the CMR field in the RTP payload header of an AMR or AMR-WB Codec based VoIP packet that is sent in the reverse direction, or so on.

If the current RTP packet and previous M−1 RTP packets (a total of M consecutive packets) received on the RTP stream are not received with the first pattern, the receiver may optionally send a rate-kept signal to the sender to request for keeping the current source rate (block 950). For example, for an AMR or AMR-WB CODEC based VoIP application, the receiver may send an in-band signal to piggy-back a rate-kept signal by setting the CMR field to a mode index corresponding to the current rate in the RTP payload header of a VoIP packet that is sent over the reverse direction without incurring additional signaling overhead.

If the receiver determines in block 920 that the current source rate of the RTP stream is not at the lowest supported source rate that has been negotiated, the receiver may further determine if the current RTP packet and the previous M−1 RTP packets (a total of M consecutive packets) received on the RTP stream are received with the all-ECT marking pattern or not (block 960). If the current RTP packet and the previous M−1 RTP packets (a total of M consecutive packets) received on the RTP stream are received with the all-ECT marking pattern, the receiver may optionally send a rate-kept signal to the sender to request for keeping the current source rate (block 950).

If the current RTP packet and the previous M−1 RTP packets (a total of M consecutive packets) received on the RTP stream are not received with the all-ECT marking pattern, the receiver further determines if the current RTP packet and the previous M−1 RTP packets (a total of M consecutive packets) received on the RTP stream are received with the all-CE marking pattern, which is the rate-reduction-requested pattern and which is also known as a third pattern (block 970).

If the current RTP packet and the previous M−1 RTP packets (a total of M consecutive packets) received on the RTP stream are not received with the all-CE marking pattern, the receiver may optionally send a rate-kept signal to the sender to request for keeping the current source rate (block 950). If the current RTP packet and the previous M−1 RTP packets (a total of M consecutive packets) received on the RTP stream are received with the all-CE marking pattern, the receiver may send an RTCP ECN Feedback message to the sender to report the congestion and to request for reducing the source rate (block 980).

Therefore, based on the techniques described above, when the sender receives a rate-up-switch signal from the receiver which requests for increasing the source rate, the sender should have room for increasing the source rate therefore it should generate new RTP packets on the RTP stream at a higher source rate than before, which results in a larger RTP payload size thereby possibly requiring a larger radio resource for transmitting the RTP packet over a radio link. Since the signaling of the rate-up-switch is based on a clear permission and request from the eNB, the ping-pong effect is unlikely. After performing a first rate-up-switch from the lowest supported source rate that has been negotiated, the sender regains the ability for further reducing the source rate on the RTP stream. Therefore the sender resumes the all-ECT marking pattern on the RTP packets it sends out on the RTP stream.

According to yet another embodiment, a method is provided for further increasing the source rate of an RTP stream from an intermediate source rate when the eNB detects that the radio access network is not congested. A fifth pattern is introduced, in addition to the first four patterns that have been discussed previously. According to an embodiment, the sender still sends out RTP packets only with either the first or the second marking pattern to indicate if the RTP stream is at the lowest supported source rate that has been negotiated during the call setup or not. When an eNB observes the second marking pattern, which is the all-ECT marking pattern and is both the rate-reduction-allowed and rate-up-allowed pattern, on a RTP stream, if the eNB neither selects the RTP stream for increasing the source rate in response to an uncongested condition, nor does the eNB select the RTP stream for reducing the source rate in response to a congested condition, the eNB may change the ECT mark on every other RTP packet received on this RTP stream to the CE mark to indicate a request for keeping the current intermediate source rate.

The alternating marking pattern between the CE mark and the ECT mark is known as the fifth pattern, which is a rate-reduction-allowed and rate-up-prohibited pattern. The fifth pattern may be used to indicate that at least one upstream node, such as an upstream eNB, wishes not to increase the source rate, while any downstream node, such as an downstream eNB, may further request for a reduction in the source rate due to congestion experienced by changing the ECT mark on the remaining every other RTP packet to the CE mark, which effectively changes the fifth marking pattern on the RTP stream into the all-CE marking pattern that is the rate-reduction-requested pattern (also known as the third pattern).

Table 2 lists various marking patterns of length two (M=2) at different entities involved in packet transmission.

TABLE 2

| # | Pattern Name | Sender | eNB | Receiver |
|---|---|---|---|---|
| 1st | Rate-Reduction-Prohibited and Rate-Up-Allowed | (ECT, not-ECT) | (ECT, not-ECT) | (ECT, not-ECT) |
| 2nd | Rate-Reduction-Allowed and Rate-Up-Allowed | (ECT, ECT) | (ECT, ECT) | (ECT, ECT) |
| 3rd | Rate-Reduction-Requested | Not applicable | (CE, CE) | (CE, CE) |
| 4th | Rate-Reduction-Prohibited and Rate-Up-Prohibited | Not applicable | (CE, not-ECT) | (CE, not-ECT) |
| 5th | Rate-Reduction-Allowed and Rate-Up-Prohibited | Not applicable | (CE, ECT) | (CE, ECT) |

Figure 10:
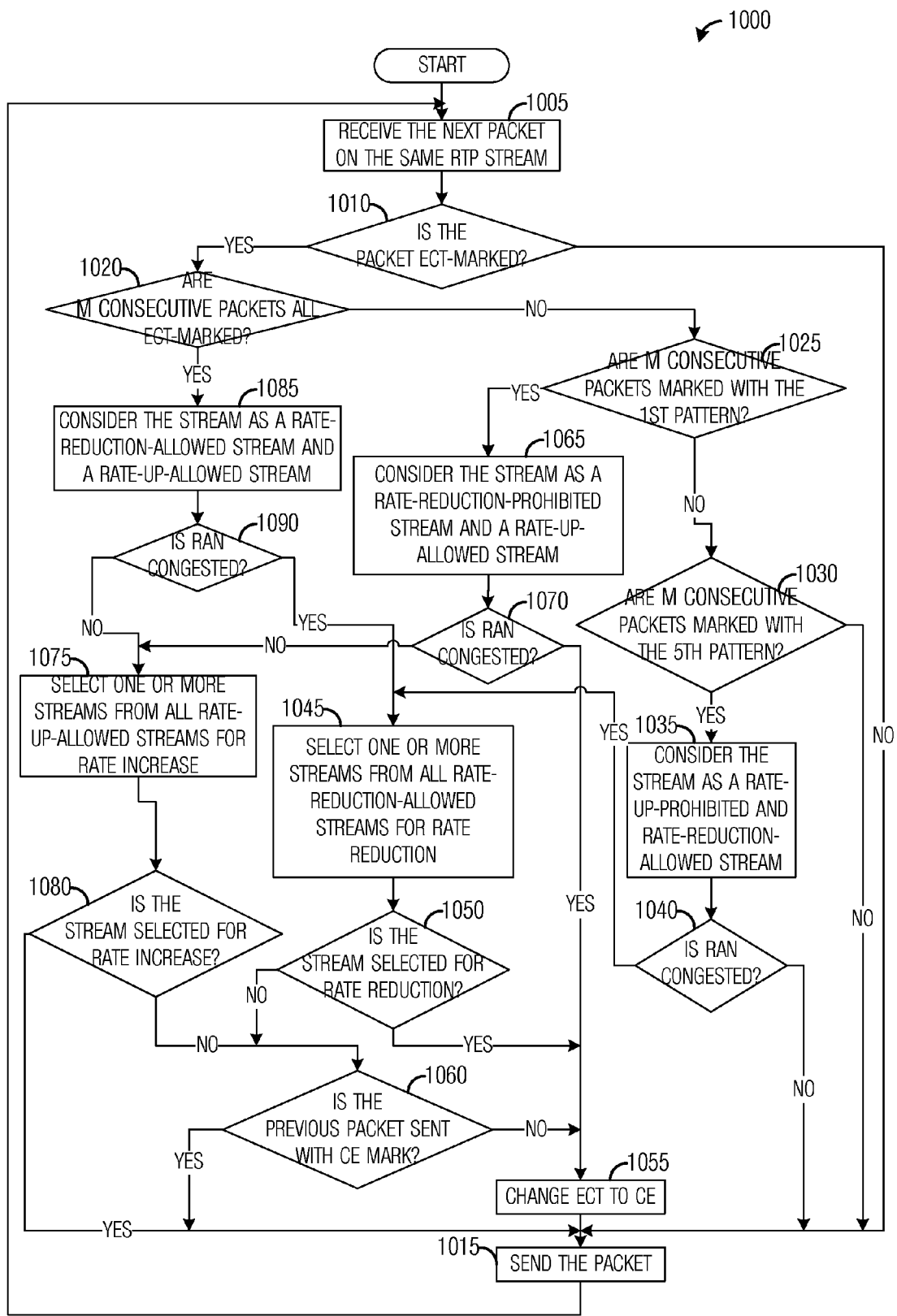
FIG. 10 is flow diagram of eNB operations for receiving and forwarding an RTP packet with the further enhancements allowing rate increase from an intermediate rate.

FIG. 10 illustrates flow diagram of eNB operations 1000 for receiving and forwarding an RTP packet with the further enhancements allowing rate increase from an intermediate rate. eNB operations 1000 may be indicative of operations occurring in an eNB serving a UE that is sending or receiving RTP packets. eNB operations 1000 may occur when an eNB is receiving RTP packets to send to a UE or from a UE.

Referring to FIG. 10, the eNB receives a new RTP packet on a particular RTP stream (block 1005). The eNB may determine if the RTP packet is received with the ECT mark or not (block 1010). If the RTP packet is not received with the ECT mark, the eNB sends the RTP packet towards its destination (block 1015). If the RTP packet is received with the ECT mark, the eNB may further determine if the current RTP packet and the previous M–1 RTP packets (a total of M consecutive packets) received on the RTP stream are received with the all-ECT marking pattern, which is the rate-reduction-allowed and rate-up-allowed pattern, and is also known as the second pattern, where M is an integer number (block 1020).

If the current RTP packet and the previous M–1 RTP packets (a total of M consecutive packets) received on the RTP stream are not received with the all-ECT marking pattern, the eNB may further determine if the current RTP packet and the previous M–1 RTP packets (a total of M consecutive packets) received on the same RTP stream are received with the first pattern or not (block 1025). If the current RTP packet and the previous M–1 RTP packets (a total of M consecutive packets) received on the same RTP stream are not received with the first pattern, the eNB further determine if the current RTP packet and the previous M–1 RTP packets (a total of M consecutive packets) received on the same RTP stream are received with the fifth pattern or not (block 1030).

If the current RTP packet and the previous M–1 RTP packets (a total of M consecutive packets) received on the same RTP stream are not received with the fifth pattern, the eNB may send the RTP packet towards its destination (block 1015). If the current RTP packet and the previous M–1 RTP packets (a total of M consecutive packets) received on the same RTP stream are received with the fifth pattern, the eNB may consider the RTP stream as a rate-up-prohibited stream and a rate-reduction-allowed stream (block 1035). Then the eNB may further determine if a congested condition is experienced at the radio access network or not (block 1040).

If a congested condition is not experienced at the radio access network, the eNB may send the RTP packet towards its destination (block 1015). If a congested condition is experienced at the radio access network, in response to the congested condition the eNB may select one or more RTP streams from all rate-reduction-allowed RTP streams for reducing the source rate (block 1045). Then the eNB may further determine if the RTP stream(s) is selected for reducing the source rate or not (block 1050).

If the RTP stream(s) is selected for reducing the source rate, the eNB changes the ECT mark on the received RTP packet to the CE mark (block 1055) before sending the RTP packet towards its destination (block 1015). If the RTP stream(s) is not selected for reducing the source rate, the eNB may further determine if the previous RTP packet received on the particular RTP stream is sent with the CE mark or not (block 1060).

If the previous RTP packet received on the particular RTP stream is sent with the CE mark, the eNB may send the RTP packet towards its destination (block 1015). If the previous RTP packet received on the particular RTP stream is not sent with the CE mark, the eNB changes the ECT mark on the received RTP packet to the CE mark (block 1055) prior to sending the RTP packet towards its destination (block 1015).

If the eNB determines in block 1025 that the current RTP packet and the previous M–1 RTP packets (a total of M consecutive packets) received on the RTP stream are received with the first pattern, the eNB may consider the RTP stream as a rate-reduction-prohibited and a rate-up-allowed stream (block 1065). Then the eNB may further determine if a congested condition is experienced at the radio access network or not (block 1070).

If a congested condition is experienced at the radio access network, the eNB may change the ECT mark on the received RTP packet to the CE mark (block 1055) prior to sending the RTP packet towards its destination (block 1015). If a congested condition is not experienced at the radio access network, in response to the un-congested condition the eNB may select one or more RTP streams from all rate-up-allowed RTP streams for increasing the source rate (block 1075). Then the eNB may further determine if the RTP stream(s) is selected for increasing the source rate or not (block 1080).

If the RTP stream(s) is selected for increasing the source rate, the eNB may send the RTP packet towards its destination (block 1015). If the RTP stream(s) is not selected for increasing the source rate, the eNB may further determine if the previous RTP packet received on the particular RTP stream is sent with the CE mark or not (block 1060). If the previous RTP packet received on the particular RTP stream is sent with the CE mark, the eNB may send the RTP packet towards its destination (block 1015). If the previous RTP packet received on the particular RTP stream is not sent with the CE mark, the eNB may change the ECT mark on the received RTP packet to the CE mark (block 1055) prior to sending the RTP packet towards its destination (block 1015).

If the eNB determines in block 1020 that the current RTP packet and the previous M–1 RTP packets (a total of M consecutive packets) received on the RTP stream are received with the all-ECT marking pattern, the eNB may consider the RTP stream as a rate-reduction-allowed and a rate-up-allowed stream (block 1085). Then the eNB may further determine if a congested condition is experienced at the radio access network or not (block 1090). If a congested condition is experienced at the radio access network, in response to the congested condition the eNB may select one or more RTP streams from all rate-reduction-allowed RTP streams for reducing the source rate (block 1045).

Then the eNB may further determine if the RTP stream is selected for reducing the source rate or not (block 1050). If the RTP stream is selected for reducing the source rate, the eNB may change the ECT mark on the received RTP packet to the CE mark (block 1055) prior to sending the RTP packet towards its destination (block 1015). If the RTP stream is not selected for reducing the source rate, the eNB may further determine if the previous RTP packet received on the RTP stream is sent with the CE mark or not (block 1060).

If the previous RTP packet received on the RTP stream is sent with the CE mark, the eNB may send the RTP packet towards its destination (block 1015). If the previous RTP packet received on the RTP stream is not sent with the CE mark, the eNB may change the ECT mark on the received RTP packet to the CE mark (block 1055) prior to sending the RTP packet towards its destination (block 1015).

If the eNB determines in block 1090 that an un-congested condition is experienced at the radio access network, in response to the un-congested condition the eNB may select one or more RTP streams from all rate-up-allowed RTP streams for increasing the source rate (block 1075). Then the eNB may further determine if the RTP stream is selected for increasing the source rate or not (block 1080).

If the RTP stream is selected for increasing the source rate, the eNB may send the RTP packet towards its destination (block 1015). If the RTP stream is not selected for increasing the source rate, the eNB may further determine if the previous RTP packet received on the particular RTP stream is sent with the CE mark or not (block 1060). If the previous RTP packet received on the particular RTP stream is sent with the CE mark, the eNB may send the RTP packet towards its destination (block 1015). If the previous RTP packet received on the particular RTP stream is not sent with the CE mark, the eNB may change the ECT mark on the received RTP packet to the CE mark (block 1055) prior to sending the RTP packet towards its destination (block 1015).

The receiver's response to an all-CE marking pattern is the same as described previously. In addition, if the receiver observes the alternating marking pattern between the CE mark and the ECT mark, i.e., the fifth pattern, on the plurality of currently and previously received RTP packets on an RTP stream, the receiver may consider that at least one upstream node along the path of the RTP stream wishes to keep the source rate at the current source rate, which is not the lowest supported source rate that has been negotiated. Therefore, the receiver does not need to send a congestion feedback message to the sender in response to the CE mark received on the every other RTP packets.

If the receiver observes the all-ECT marking pattern, i.e., the second pattern, on the plurality of currently and previously received RTP packets on an RTP stream, the receiver may consider that all upstream eNBs along the path of the RTP stream wish to increase the source rate and there is no congestion at any other intermediate node along the path. From the information about the source rate that is in the RTP header of the received RTP packet, the receiver may determine if the current source rate is at the highest supported source rate that has been negotiated or not. If not, the receiver may send a rate-up-switch signal to the sender to indicate a request for increasing the source rate. As discussed previously, the rate-up-switch signal may be a modified RTCP RR message, a new RTCP ECN Feedback message, an in-band signaling such as the CMR field in the RTP payload header of an AMR or AMR-WB Codec based VoIP packet that is sent in the reverse direction, or so on.

Figure 11:
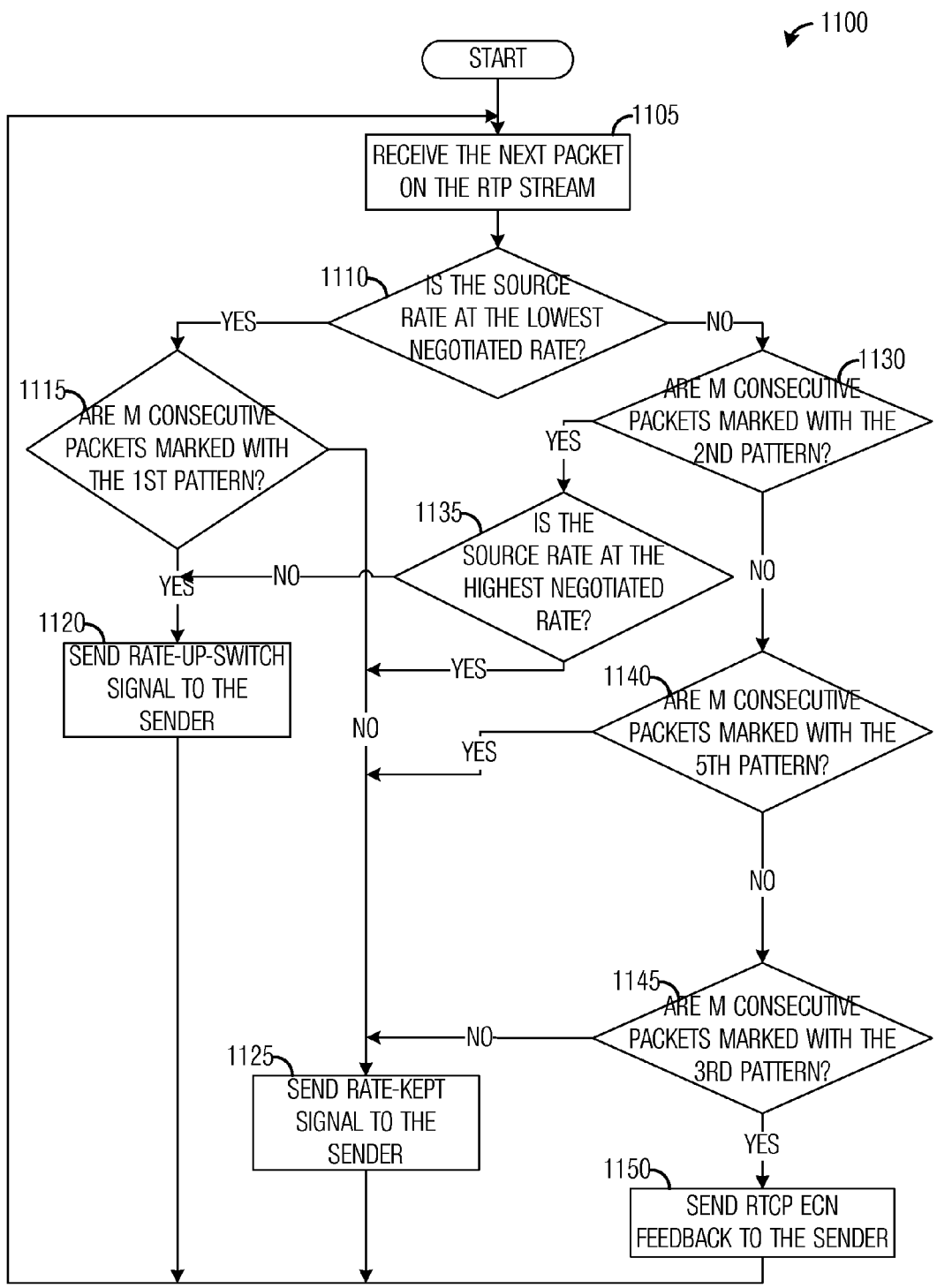
FIG. 11 is a flow diagram of receiver operations for responding to a received RTP packet with the further enhancements allowing rate increase from an intermediate rate.

FIG. 11 illustrates a flow diagram of receiver operations 1100 for responding to a received RTP packet with the further enhancements allowing rate increase from an intermediate rate. Receiver operations 1100 may be indicative of operations occurring in a receiver receiving RTP packets. Receiver operations 1100 may occur while a receiver, e.g., a UE or a destination device, receives RTP packets sent by a source device.

Referring to FIG. 11, the receiver of a particular RTP stream receives a new RTP packet on the RTP stream (block 1105). The receiver may determine if a current source rate of the RTP stream is at the lowest supported source rate that has been negotiated or not by comparing the information of the current source rate in the RTP header of the currently received RTP packet and the information of the set of supported source rates negotiated during the call setup for the RTP stream (block 1110). If a current source rate of the RTP stream is at the lowest supported source rate negotiated, the receiver may further determine if the current RTP packet and the previous M−1 RTP packets (a total of M consecutive packets) received on the same RTP stream are received with the first pattern or not, where M is an integer number (block 1115).

If the current RTP packet and the previous M−1 RTP packets (a total of M consecutive packets) received on the same RTP stream are received with the first pattern, the receiver may send a rate-up-switch signal to the sender to request for increasing the source rate (block 1020). According to an embodiment, the rate-up-switch signal may be in the form of a modified RTCP RR message, a new RTCP ECN feedback message, an in-band signaling such as the CMR field in the RTP payload header of an AMR or AMR-WB Codec based VoIP packet that is sent in the reverse direction, or so on, as described previously.

If the current RTP packet and the previous M−1 RTP packets (a total of M consecutive packets) received on the same RTP stream are not received with the first pattern, the receiver may optionally send a rate-kept signal to the sender to request for keeping the current source rate (block 1125). For example, for an AMR or AMR-WB CODEC based VoIP application, the receiver may send such a rate-kept signal via an in-band signaling by setting the CMR field to the mode index corresponding to the current rate in the RTP payload header of the VoIP packet that is sent over the reverse direction without incurring additional signaling overhead.

If the receiver determines in block 1110 that the current source rate of the RTP stream is not at the lowest supported source rate that has been negotiated, the receiver may further determine if the current RTP packet and the previous M−1 RTP packets (a total of M consecutive packets) received on the same RTP stream are received with the second pattern or not (block 1130). If the current RTP packet and the previous M−1 RTP packets (a total of M consecutive packets) received on the same RTP stream are received with the second pattern, the receiver may further determine if the current source rate of the RTP stream is at the highest supported source rate that has been negotiated or not (block 1135).

If the current source rate of the RTP stream is not at the highest supported source rate negotiated, the receiver may send a rate-up-switch signal to the sender to request for increasing the source rate (block 1120). If the current source rate of the RTP stream is at the highest negotiated source rate, the receiver may optionally send a rate-kept signal to the sender to request for keeping the current source rate (block 1125).

If the receiver determines in block 1130 that the current RTP packet and the previous M−1 RTP packets (a total of M consecutive packets) received on the RTP stream are not received with the second pattern, the receiver may further determine if the current RTP packet and the previous M−1 RTP packets (a total of M consecutive packets) received on the RTP stream are received with the fifth pattern or not (block 1140). If the current RTP packet and the previous M−1 RTP packets (a total of M consecutive packets) received on the RTP stream are received with the fifth pattern, the receiver may optionally send a rate-kept signal to the sender to request for keeping the current source rate (block 1125). If the current RTP packet and the previous M−1 RTP packets (a total of M consecutive packets) received on the RTP stream are not received with the fifth pattern, the receiver may further determine if the current RTP packet and the previous M−1 RTP packets (a total of M consecutive packets) received on the same RTP stream are received with the third pattern or not (block 1145).

If the current RTP packet and the previous M−1 RTP packets (a total of M consecutive packets) received on the same RTP stream are not received with the third pattern, the receiver may optionally send a rate-kept signal to the sender to request for keeping the current source rate (block 1125). If the current RTP packet and the previous M−1 RTP packets (a total of M consecutive packets) received on the same RTP stream are received with the third pattern, the receiver sends an RTCP ECN Feedback message to the sender to report the congestion and to request for reducing the source rate (block 1150).

Therefore, based on the embodiments described above, when the sender receives a rate-up-switch signal from the receiver which requests for increasing the source rate from either the lowest supported source rate or an intermediate source rate, the sender should have room for increasing the source rate. The sender should therefore generate new RTP packets on the RTP stream at a higher source rate than before, which results in a larger RTP payload size thereby possibly requiring a larger radio resource for transmitting the RTP packet over the radio link. However, since the signaling of the rate-up-switch is based on the clear permission and request from the eNB, the ping-pong effect is unlikely.

FIGS. 12a through 12i illustrate various scenarios for using the congestion control techniques. In FIGS. 12a through 12i, UE2 is the sender and UE1 is the receiver. eNB2 is serving UE2 and eNB1 is serving UE1.

Figure 12A:
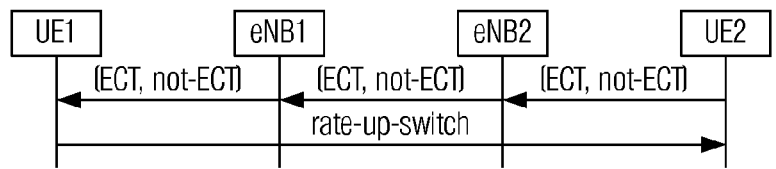
FIGS. 12a through 12i are diagrams of various scenarios for using the congestion control techniques.
Figure 12B:
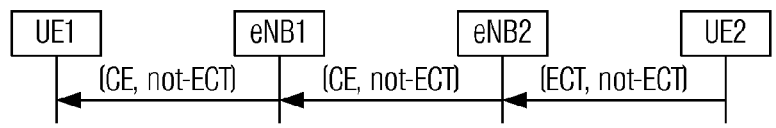

FIG. 12a illustrates a scenario where UE2 is at the lowest supported rate, neither eNB 1 DL nor eNB2 UL is congested, and both wish to increase UE2 rate. Therefore, UE1 signals rate-up-switch. FIG. 12b illustrates a scenario where UE2 is at the lowest supported rate, eNB2 wishes to keep UE2 rate, and eNB1 may wish to either keep or increase UE2 rate. Therefore, UE1 doesn't send rate-up-switch or RTCP ECN Feedback message.

Figure 12C:
Figure 12D:
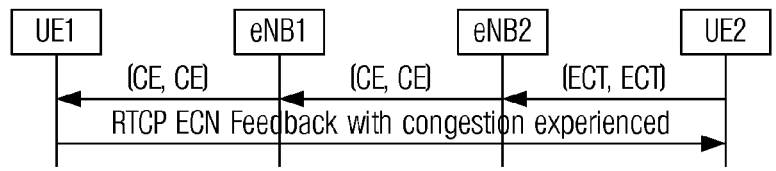

FIG. 12c illustrates a scenario where UE2 is at the lowest supported rate, and eNB2 wishes to increase UE2 rate but eNB1 wishes to keep UE2 rate. Therefore, UE1 doesn't send rate-up-switch or RTCP ECN Feedback message. FIG. 12d illustrates a scenario where UE2 is not at the lowest supported rate, eNB2 UL is congested and wishes to reduce UE2 rate, and eNB1 DL may be either congested or not congested. Therefore, UE1 sends the RTCP ECN Feedback message.

Figure 12E:
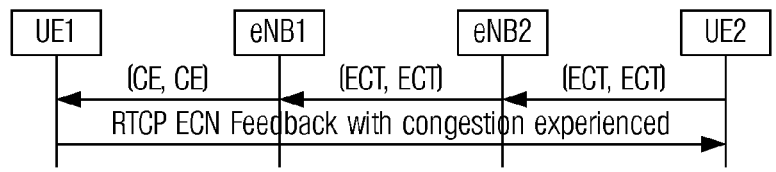
Figure 12F:

FIG. 12e illustrates a scenario where UE2 is not at the lowest supported rate, eNB2 UL is not congested and wishes to increase UE2 rate, eNB 1 DL is congested and wishes to reduce UE2 rate. Therefore, UE1 sends the RTCP ECN Feedback message. FIG. 12f illustrates a scenario where UE2 is not at the lowest supported rate, eNB2 UL is not congested and wishes to increase UE2 rate, and eNB1 DL is not congested but wishes to keep UE2 rate. Therefore, UE1 doesn't send rate-up-switch or RTCP ECN Feedback message.

Figure 12G:
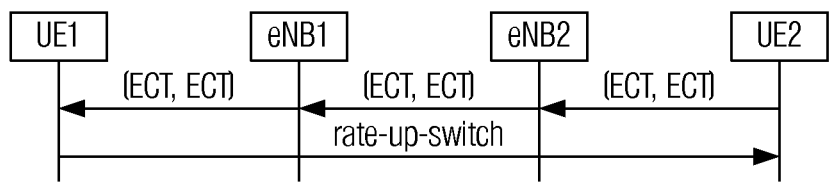
Figure 12H:
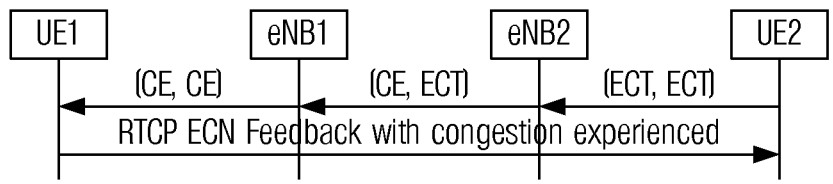
Figure 12I:

FIG. 12g illustrates a scenario where UE2 is not at the lowest supported rate, and neither eNB1 DL nor eNB2 UL is congested and both wish to increase UE2 rate. Therefore, UE1 sends the rate-up-switch signal. FIG. 12h illustrates a scenario where UE2 is not at the lowest supported rate, eNB2 UL is not congested but wishes to keep UE2 rate, and eNB 1 DL is congested and wishes to reduce UE2 rate. Therefore, UE1 sends the RTCP ECN Feedback message. FIG. 12i illustrates a scenario where UE2 is not at the lowest supported rate, eNB2 UL is not congested but wishes to keep UE2 rate, and eNB 1 UL is not congested and may wish to either keep or increase UE2 rate. Therefore, UE1 doesn't send rate-up-switch or RTCP ECN Feedback message.

The sender marks the RTP packets of an RTP stream with a particular pattern in sequence, e.g., based on RTP sequence numbers. However, the RTP packets may be delivered to the eNB or to the receiver out of order. Since the receiver is equipped with full protocol stack, the receiver may be able to sort the received RTP packets and place the RTP packets in sequence before determining the marking pattern received.

The eNB may be built with capabilities to fully understand each header of IP, UDP, and RTP (including the options and extensions fields in the headers) packets in order to fetch the RTP sequence number in the RTP header of the RTP packet for sorting. However, the additional processing of the IP, UDP, and RTP packets may increase both the delay in forwarding the RTP packet and the complexity at the eNB.

According to yet another embodiment, an alternative method for dealing with out-of-order delivery of RTP packets at the eNB is provided. In general, if the value of M is set sufficiently large (e.g., 8, 10, 12, 14, 16, or larger), where M is an integer number and preferably an even number, the eNB may use the statistical 1:1 ratio between the two different types of ECN marks of M consecutively received RTP packets as the criteria for determining the marking pattern.

As an example, if a ratio of the ECT mark to the Not-ECT mark and the ratio of the ECT mark to the CE mark are both much higher than 1:1, it is considered that the all-ECT marking pattern (i.e., the second pattern) is received. While, if a ratio of the CE mark to the Not-ECT mark and the ratio of the CE mark to the ECT mark are both much higher than 1:1, it is considered that the all-CE marking pattern (i.e., the third pattern) is received. Similarly, if a ratio of the Not-ECT mark to the ECT mark is roughly 1:1 and there is no significant presence of the CE mark, it may be considered that the first marking pattern is received, while if a ratio of the Not-ECT mark to the CE mark is roughly 1:1 and there is no significant presence of the ECT mark, it is considered that the fourth marking pattern is received, and if a ratio of the ECT mark to the CE mark is roughly 1:1 and there is no significant presence of the Not-ECT mark, it is considered that the fifth marking pattern is received.

At an eNB, if the eNB wishes to switch a rate-up-allowed pattern (ECT, ECT) to a rate-kept pattern (CE, ECT), the eNB may mark every other RTP packet received with the CE mark out of the RTP packet sequence as the RTP packets may arrive out-of-order. However, the statistical 1:1 ratio may be maintained after treating the IP fragmentation, which is discussed below. Therefore, when the receiver receives the rate-kept pattern, the receiver cannot expect to receive the (CE, ECT) pattern in the exact order. Instead, the receiver should also use the ratio of 1:1 between the CE and ECT marks to recognize the rate-kept pattern. With the rate-reduction-requested pattern (CE, CE), no problems with out of order delivery occurs at either the eNB or the receiver, while with the rate-reduction-allowed and rate-up-allowed pattern (ECT, ECT), no problems with out of order delivery occurs at the receiver.

When only considering the embodiments that allow for rate increases from a lowest supported source rate without regard for those that further allow rate increases from an intermediate rate, a receiver may be able to determine the marking pattern by checking with the exact marking patterns after the receiver sorts out its received RTP packets based on the RTP sequence number. However, if the embodiments that allow for rate increases from an intermediate rate are considered, the eNB may mark the received RTP packets with the fifth pattern out of the RTP sequence if the eNB does not sort the received RTP packets, since the eNB may not be able to fetch the RTP sequence number in the RTP header of the RTP packet in order to avoid a delay that may be caused. Therefore, even though a receiver may be able to sort the received RTP packets in a sequence, the receiver may not be able to expect to observe a fifth pattern in the received RTP packets in the exact order of the RTP sequence number. Thus the receiver may also use a ratio between the ECT mark and the CE mark to check for the fifth pattern. In general, the receiver has no problem for checking for the other four patterns based on the exact marking pattern.

An IP datagram may be fragmented by an intermediate node if the size of the IP datagram is greater than a Maximum Transmission Unit (MTU) that the node can handle. Although an unlikely issue for audio packets which tend to be small, for larger video packets, fragmentation may become an issue. Some video standard allows fragmentation at the RTP layer to avoid IP fragmentation, such as IETF RFC 3984 for H.264 video standard. In general, IP Fragmentation is not an issue for the receiver as the receiver is equipped with full protocol stack and it reassembles the IP datagram, which contains a single RTP packet, before determining the marking pattern. For the eNB, a simple solution is to disable IP fragmentation from the sender (e.g., set DF field="1" in the IP header via socket API), thus no network node can fragment the IP datagram. However, if the size of the IP datagram (a packet) is greater than a MTU that an intermediate network node is capable of processing, the packet may be dropped by that node.

According to yet another embodiment, an alternative method for dealing with IP fragmentation of RTP packets that are received at the eNB is described as follows: The eNB considers all IP packets received and having the same value for four fields: identification, source, destination, and protocol in the IP header as a single packet. Meaning that the eNB counts all of the IP packets as a single packet when counting a ratio of the Not-ECT marks and the ECT/CE marks so as to maintain the roughly 1:1 ratio for recognizing the rate-reduction-prohibited pattern. Additionally, the eNB changes them all (the IP packets considered as a single packet) when changing the ECT mark to the CE mark and vice versa, i.e., the eNB doesn't change marks in the middle of fragments so as to not confuse a downstream eNB or the receiver.

Furthermore, the eNB changes the ECT mark to the CE mark only if the IP packet is not fragmented, or if it is a fragmented IP packet, the value of identification field in the IP header must be encountered for the first time within a time window with the same source, destination, and protocol values. And if having previously within a time window sent a fragmented IP packet with the CE mark, the eNB continues to send any fragmented IP packets of the same identification, source, destination, and protocol values with the CE mark, even if the eNB wishes to request for increasing the source rate on the RTP stream. Therefore, the eNB may have to wait for a new RTP packet to signal such a request. By doing so, the eNB doesn't need to reassemble the fragmented IP datagram.

According to yet another embodiment, a method is provided for enabling a nonce mechanism in the new marking patterns. According to an embodiment, a sender may randomly generates an ECT codepoint: ECT(x), where x=0 or 1, for every other RTP packet. If the (ECT, Not-ECT) marking pattern, i.e., the first pattern, is sent, the remaining every other RTP packet is marked with Not-ECT. If (ECT, ECT) marking pattern, i.e., the second pattern, is sent, the remaining every other RTP packet is marked the same way as its previous RTP packet. Also, the odd-numbered RTP packets may be required to follow the even-numbered ones or vice versa to simplify the receiver algorithm. The sender computes the nonce sum (NS) values by skipping the Not-ECT marks or the repeated ECT marks and the receiver does the same, therefore knowing packet order helps to simplify the receiver.

Once the sender reaches the highest supported CODEC rate that has been negotiated during the call setup, the sender may continue to mark the RTP packets with the all-ECT marking pattern, i.e., rate-reduction-allowed and rate-up-allowed pattern. Frame redundancy and aggregation parameters may be set according to other statistics, such as frame error rate, jitter in the RTCP Receiver Report message, and so forth. Since the eNB is agnostic at the highest supported CODEC rate that has been negotiated at the application layer, the eNB may still request for more rate-up-switches by not changing any ECT marks. However, since the receiver knows the highest supported CODEC rate of the sender, the receiver does not signal any rate-up-switches.

According to an alternative embodiment that allows rate increases only from the lowest supported rate, the first four patterns may be re-defined without using the Not-ECT mark. Specific, the first pattern is changed to a pattern that alternates between the CE mark and the ECT mark and is used to indicate a rate-reduction-prohibited and rate-up-allowed stream. The second pattern is changed to an all-ECT marking pattern and is used to indicate a rate-reduction-allowed and rate-up-prohibited stream. The third pattern is changed to an all-CE marking pattern, and is used to indicate a rate-reduction-requested stream with the RTP header of the received RTP packet indicating that the current source rate is not at the lowest supported source rate that has been negotiated. The fourth pattern is changed to an all-CE marking pattern as well, and is used to indicate a rate-reduction-prohibited and rate-up-prohibited stream with the RTP header of the received RTP packet indicating that the current source rate is at the lowest supported source rate that has been negotiated.

The sender still only sends out RTP packets with either the first or the second pattern. The eNB or an intermediate node may change the pattern to the third or the fourth pattern. The receiver can distinguish the third and fourth pattern by determine if the current source rate is at the lowest supported source rate or not. The eNB may not be able to distinguish between the third and fourth patterns, however the inability to distinguish between the third and fourth patterns does not prevent the eNB from selecting the right streams for reducing the source rate in response to a congested condition or for increasing the source rate in response to an un-congested condition, however the eNB may only do so from the lowest supported source rate that has been negotiated.

Due to a lack of the fifth pattern, the alternative embodiment does not allow for rate increases from an intermediate rate. However, because there is no Not-ECT mark in each of the four marking patterns, it may be easier to differentiate these four marking patterns from the ECN probing pattern as described in IETF RFC 3168. It is also possible to consider ECT(0) codepoint and ECT(1) codepoint as two different types of ECN marks in order to regain the fifth pattern for allowing rate increases from an intermediate rate, without using the Not-ECT mark. However, the differentiation of ECT(0) and ECT(1) codepoints will take away the ability from the sender to randomly send the ECT(0) or ECT(1) codepoints, thereby losing some of the benefits of having two ECT codepoints, such as verifying an end-to-end path and catching a cheating receiver by using the nonce mechanism, etc.

Table 3 lists various marking patterns of length two (M=2) at different entities involved in packet transmission, wherein there is no Not-ECT mark in each of the marking patterns.

TABLE 3

| # | Pattern Name | Sender | eNB | Receiver |
|---|---|---|---|---|
| 1st | Rate-Reduction-Prohibited and Rate-Up-Allowed | (CE, ECT) | (CE, ECT) | (CE, ECT) |
| 2nd | Rate-Reduction-Allowed and Rate-Up-Prohibited | (ECT, ECT) | (ECT, ECT) | (ECT, ECT) |

TABLE 3-continued

| # | Pattern Name | Sender | eNB | Receiver |
|---|---|---|---|---|
| 3rd | Rate-Reduction-Requested | Not applicable | (CE, CE) | (CE, CE) and if not at the lowest rate yet |
| 4th | Rate-Reduction-Prohibited and Rate-Up-Prohibited | Not applicable | Not applicable | (CE, CE) and if already at the lowest rate |

After detecting a (CE, ECT) pattern, i.e., a rate-reduction-prohibited and rate-up-allowed pattern, in a RTP stream, a congested eNB may exclude the RTP stream from further rate reductions and changes any ECT marks to CE. While an uncongested eNB may include the RTP stream in a rate-up selection pool and run a stream selection algorithm. If the uncongested eNB selected the RTP stream for a rate-up, the uncongested eNB doesn't change any ECN marks or else changes only ECT marks to CE. At a receiver, after detecting a (CE, ECT) pattern in a RTP stream, the receiver may signal a rate-up-switch, using RTCP, explicit CMR, or implicit CMR, for example.

After detecting a (ECT, ECT) pattern, i.e., a rate-reduction-allowed and rate-up-prohibited pattern, in a RTP stream, a congested eNB may include the RTP stream in a congestion control selection pool and run a selection algorithm. If the RTP stream is selected for congestion control, the congested eNB may change ECT marks to CE, while an uncongested eNB may not change any marks. After detecting a rate-reduction-allowed and rate-up-prohibited pattern, the receiver may not send any signal to the sender.

Since a rate-reduction-requested pattern is an all-CE pattern and an eNB may not change any CE marks in general, the eNB will forward the RTP packets with a CE mark without changing it. After detecting a (CE, CE) pattern, a receiver may further determine if the source rate is already at the lowest supported rate that has been negotiated. If the source rate is already at the lowest supported rate, receiver determines that the (CE, CE) pattern represents a rate-reduction-prohibited and rate-up-prohibited pattern and may not send any signal to the sender, or else the receiver determines that the (CE, CE) pattern represents a rate-reduction-requested pattern and may send RTCP ECN feedback to report the congestion.

Figures 13A, 13B:
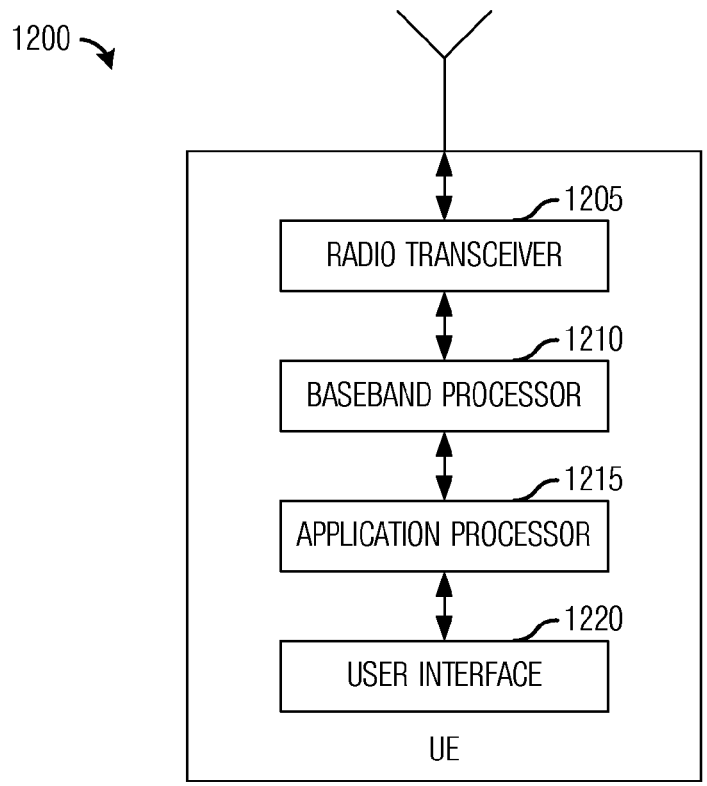

FIG. 13a illustrates a UE 1200. UE 1200 may be both a sender of an RTP stream and a receiver of another RTP stream in the reverse direction as described above. UE 1200 may include a radio transceiver 1205, a baseband processor 1210, an application processor 1215, and a user interface 1220. Radio transceiver 1205 may be used to send and receive signals (encoded with packet data) via transmit and/or receive antennas coupled to UE 1200. Radio transceiver 1205 may also include other circuitry that may be used to process signals to be sent or received, including but not limited to filtering, amplifying, and so forth. Baseband processor 1210 may be used to provide digital processing of packet data. As an example, baseband processor 1210 may provide encoding, interleaving, modulating, decoding, de-interleaving, demodulating, and so forth, of packet data.

Application processor 1215 may be used to implement embodiments of the congestion control mechanism discussed herein. As an example, application processor 1215 may be used to implement packet marking of a packet stream if UE 1200 is operating as a sender of an RTP stream. Additionally, application processor 1215 may be used to process received packets (including marking pattern detection, packet ordering, packet reassembly, and so on), as well as sending a signal to a source of the received packets to request a decrease (or an increase) in a source rate of a CODEC used to encode data contained in the received packets. Application processor 1215 may also implement a protocol stack used in communications.

FIG. 13b illustrates a typical protocol stack 1250 implemented in an application processor, such as application processor 1215, of a UE, such as UE 1200.

Figure 14:
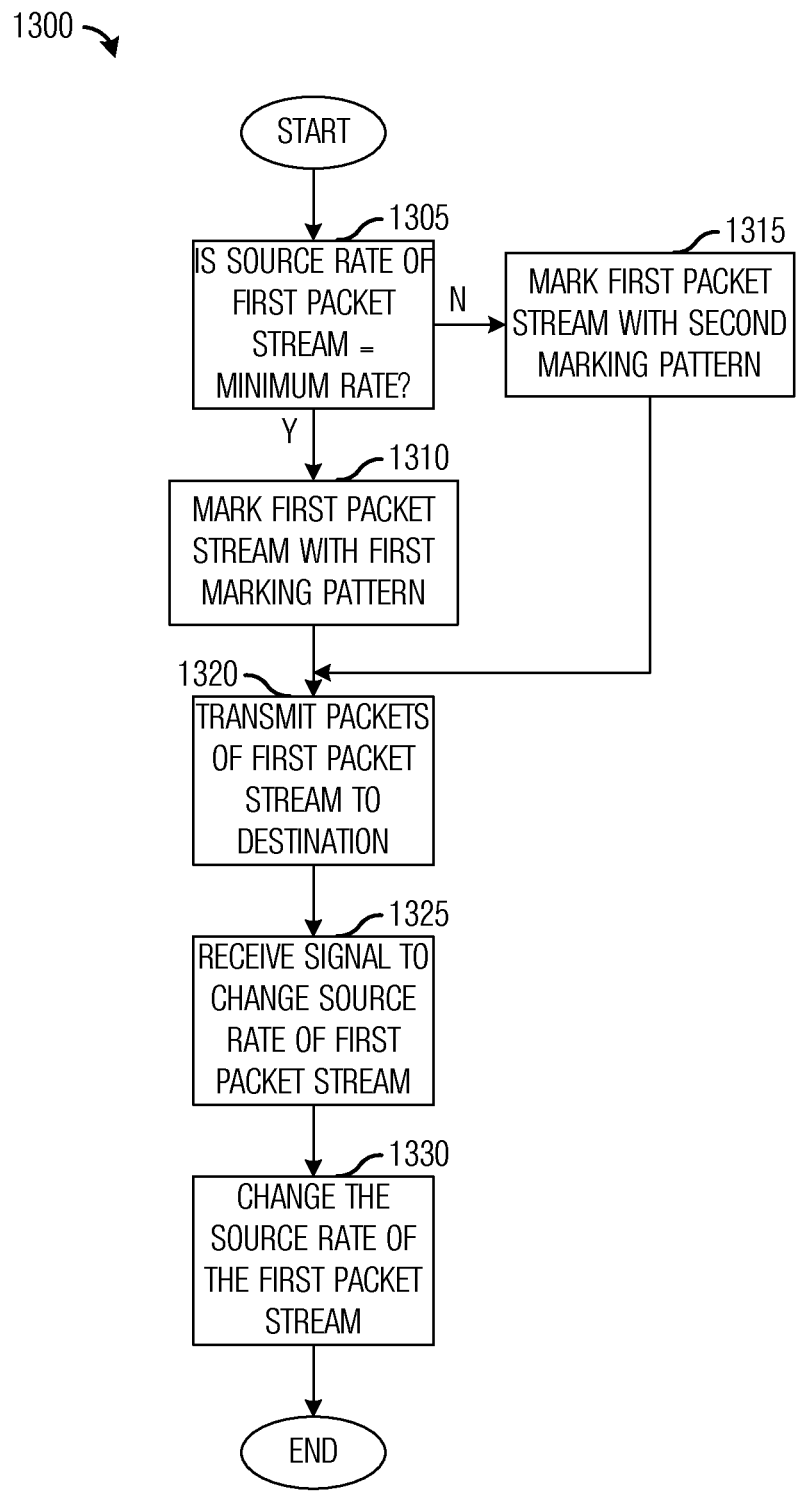
FIG. 14 is a flow diagram of sender operations in participating in communications with a receiver, wherein the communications includes a congestion control mechanism.

FIG. 14 illustrates a flow diagram of sender operations 1300 in participating in communications with a receiver, wherein the communications includes a congestion control mechanism. Sender operations 1300 may be indicative of operations occurring in a first communications device serving as a sender, such as a UE or a server, participating in communications with a second communications device serving as a receiver. Sender operations 1300 may occur while the sender is in a normal operating mode and has data to transmit to the receiver.

Sender operations 1300 may begin with the sender performing a check to determine if a CODEC source rate of a first packet stream, e.g., an RTP packet stream, is at a minimum agreed upon CODEC source rate (block 1305). If packets in the first packet stream contain data encoded at a CODEC source rate that is at the minimum agreed upon CODEC source rate, then the sender may mark the packets in the first packet stream with a first marking pattern (block 1310). According to an embodiment, the first marking pattern may be referred to as a rate-reduction-prohibited pattern, meaning that the first packet stream is not capable of further reducing its CODEC source rate. As discussed previously, the sender may mark the ECN bits of the IP headers of the packets in the first packet stream. However, rather than marking each packet in the first packet stream in an identical manner, the first marking pattern consists of M consecutive packets marked in a specified way, where M is a positive integer value greater than or equal to two. As an example, with M=2, the first marking pattern consists of either a Not-ECT mark or a CE mark, and followed by an ECT mark.

If the packets in the first packet stream contain data encoded at a CODEC source rate that is greater than the minimum agreed upon CODEC source rate, then the sender may mark the packets in the first packet stream with a second marking pattern (block 1315). According to an embodiment, the second marking pattern may be referred to as a rate-reduction-allowed pattern, meaning that the first packet stream is capable of further reducing its CODEC source rate. As an example, with M=2, the second marking pattern consists of all ECT marks.

The sender may then transmit the packets of the first packet stream marked with either the first marking pattern or the second marking pattern to their intended destination, e.g., the receiver (block 1320).

The sender may also receive a signal from a receiver of the first packet stream, wherein the signal may be a request for the sender to change the CODEC source rate of the first packet stream (block 1325). The sender may then change the CODEC source rate of the packet stream based on the signal (block 1330) and sender operations 1300 may then terminate.

According to an embodiment, if the packet stream is already at the minimum negotiated CODEC source rate, the receiver never would have sent the signal to the sender to request further rate reduction. Therefore, if the sender receives the signal requesting for rate reduction from the receiver about a packet stream, the sender is capable of reducing the CODEC source rate of the packet stream. Similar restrictions may be in place for a signal requesting that the sender increases the CODEC source rate of its packet stream.

Figures 15A, 15B:
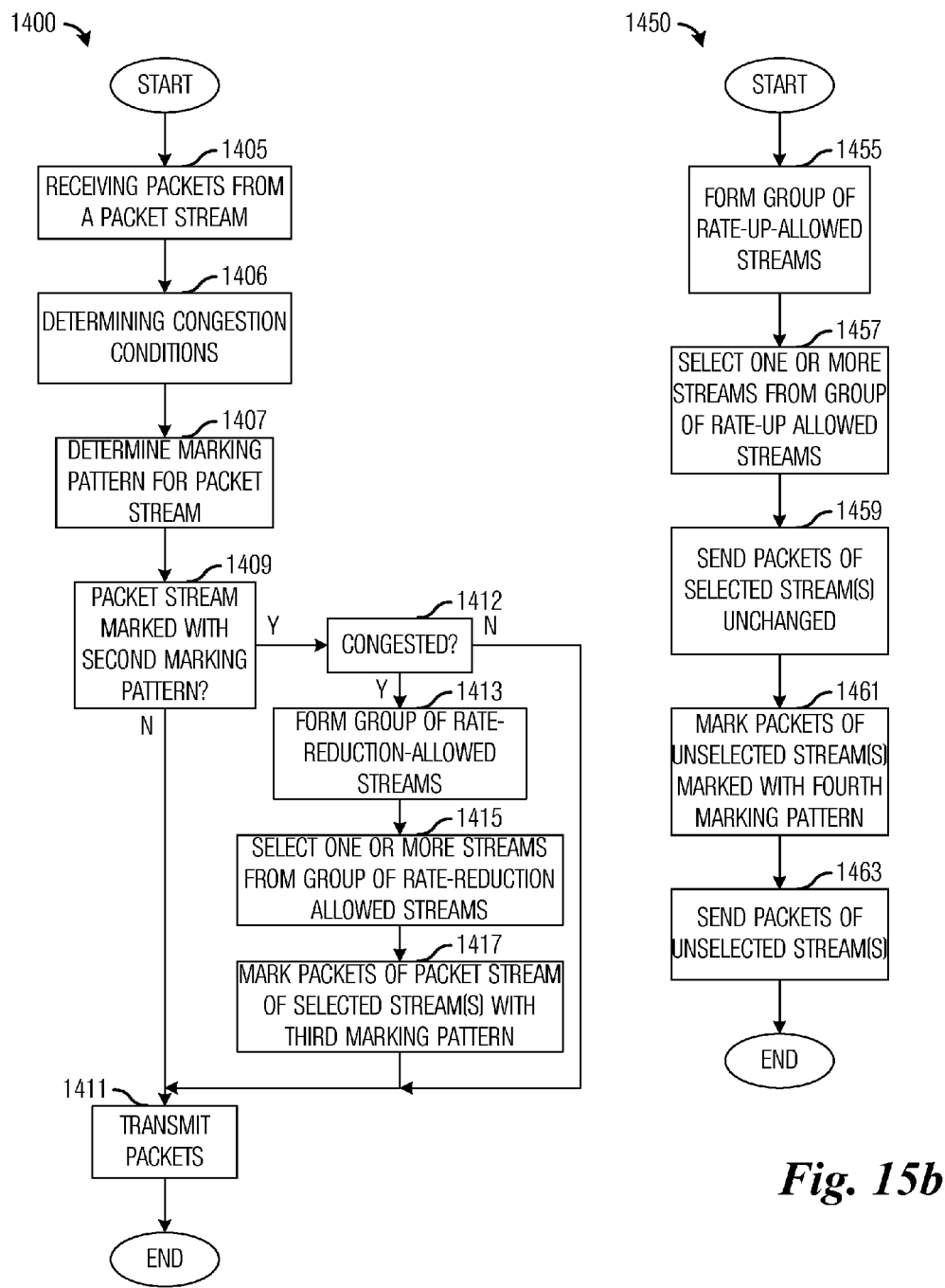
FIG. 15a is a flow diagram of first eNB operations in participating in communications between a sender and a receiver, wherein the communications includes a congestion control mechanism.
FIG. 15b is a flow diagram of second eNB operations in participating in communications between a sender and a receiver, wherein the communications includes a congestion control mechanism.

FIG. 15a illustrates a flow diagram of first eNB operations 1400 in participating in communications between a sender and a receiver, wherein the communications includes a congestion control mechanism. First eNB operations 1400 may be indicative of operations occurring in an eNB serving either a sender or a receiver of a communications between the sender and the receiver. First eNB operations 1400 may occur while the eNB is in a normal operating mode and has received data from the sender to forward to the receiver.

First eNB operations 1400 may begin with the eNB receiving packets from a marked packet stream (block 1405). The eNB may also determine its local congestion conditions (block 1406). The eNB may examine the packets to determine a marking pattern for the marked packet stream (block 1407). According to an embodiment, the eNB may examine a value of ECN bits of both the packets that has just arrived as well as previously arrived packets to determine the marking pattern. For example, if the marking pattern is spread over M packets, where M is a positive integer value, then the eNB may examine at least M packets to determine the marking pattern. If out-of-order packet delivery is a concern, then the eNB may examine more than M packets to determine a distribution of different ECN values over the M or more packets to determine the marking pattern. Alternatively, the eNB may be capable of re-ordering the packets prior to determining the marking pattern.

The eNB may perform a check to determine if the packets are marked with a second marking pattern (block 1409). As discussed previously, the second marking pattern may be used to indicate that the packet stream may be capable of reducing its CODEC source rate to help alleviate congestion conditions. If the packets are not marked with the second marking pattern, then the eNB may go ahead and transmit the packets to their destination (block 1411) and first eNB operations 1400 may then terminate.

If the packets are marked with the second marking pattern, then the packet stream may reduce its CODEC source rate to reduce congestion. The eNB may check to determine if it is experiencing congestion (block 1412). If the eNB is not experiencing congestion, then the eNB may transmit the packets of the packet stream (block 1411) and first eNB operations 1400 may then terminate.

If the eNB is experiencing congestion, the eNB may form a group of rate-reduction-allowed packet streams, which may include other packet streams that are also marked with the second marking pattern (block 1413). The eNB may then select one or more streams from the group of rate-reduction-allowed packet streams (block 1415) and change the marking pattern for packets of the selected stream(s) to a third marking pattern (block 1417). The eNB may then transmit the packets (block 1411) and first eNB operations 1400 may then terminate.

According to an embodiment, the third marking pattern may be referred to as a rate-reduction-requested pattern and may be used to indicate packet streams that may have their CODEC source rates reduced since they are not operating at their minimum CODEC source rates. With M=2, the third marking pattern may consist of all CE marks.

FIG. 15b illustrates a flow diagram of second eNB operations 1450 in participating in communications between a sender and a receiver, wherein the communications includes a congestion control mechanism. Second eNB operations 1450 may be indicative of operations occurring in an eNB serving either a sender or a receiver of a communications between the sender and the receiver. Second eNB operations 1450 may occur while the eNB is in a normal operating mode and has received data from the sender to forward to the receiver.

In addition to reducing the CODEC source rate of a packet stream, the eNB may be able to increase the CODEC source rate of a packet stream if conditions warrant, e.g., the eNB is not experiencing congestion. Second eNB operations 1450 may begin with the eNB forming a group of rate-up-allowed packet streams (block 1455). The group of rate-up-allowed packet streams may be similar to the group of rate-reduction-allowed packet streams except that the packet streams in the group of rate-up-allowed packet streams may have their CODEC source rates increased instead of decreased.

The eNB may select one or more packet streams from the group of rate-up-allowed packet streams (block 1457) and send the packets from the selected stream(s) with their marking patterns unchanged to the receiver (block 1459). However, for members of the group of rate-up-allowed packet streams that are not selected, the eNB may change their marking pattern to the fourth marking pattern (block 1461) and send their packets to the receiver (block 1463). Second eNB operations 1450 may then terminate.

According to an embodiment, the fourth marking pattern may be referred to as a rate-reduction-prohibited and rate-up-prohibited pattern and may be used to indicate packet streams that have their CODEC source rates kept unchanged. With M=2, the fourth marking pattern may consist of alternating Not-ECT marks and CE marks.

Figures 16A, 16B:
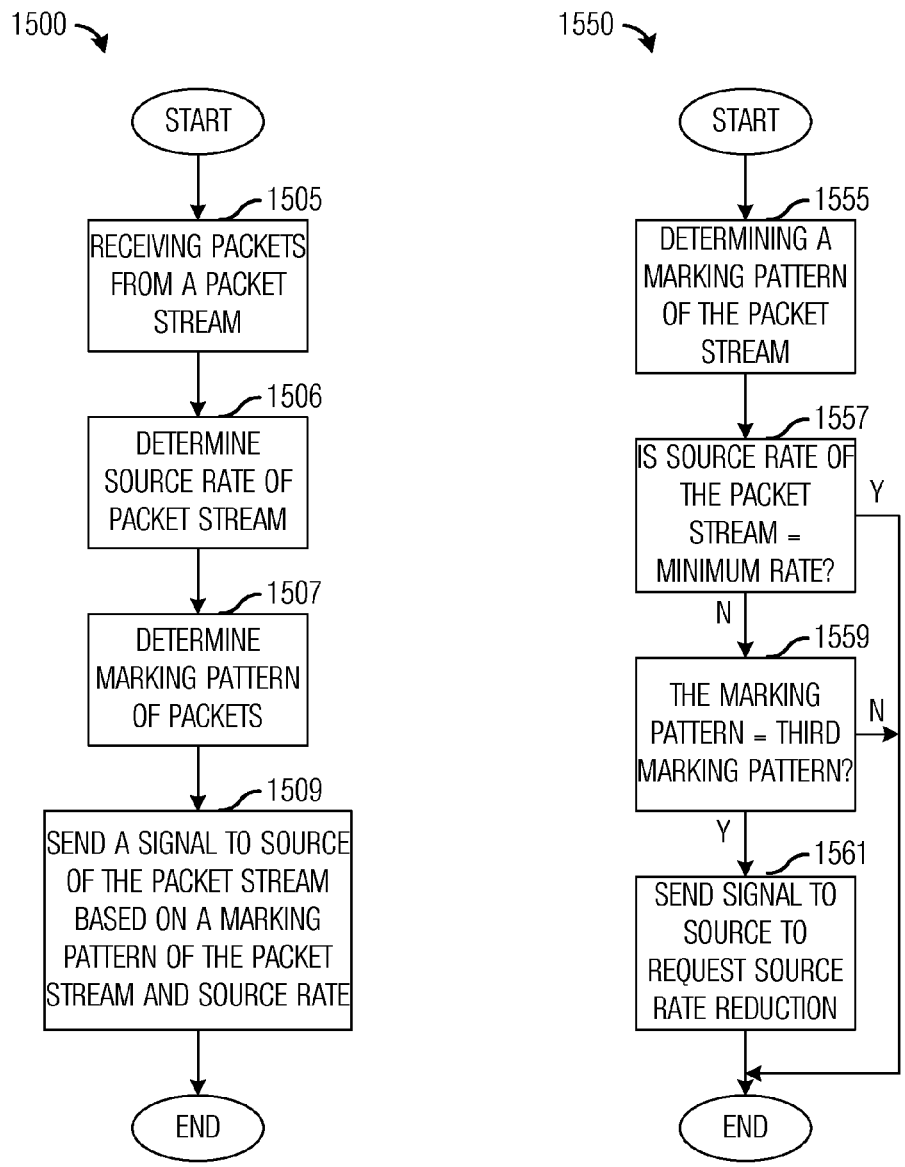
FIG. 16a is a flow diagram of first receiver operations in participating in communications with a sender, wherein the communications includes a congestion control mechanism.
FIG. 16b illustrates a flow diagram of second receiver operations 1550 in participating in communications with a sender, wherein the communications includes a congestion control mechanism.

FIG. 16a illustrates a flow diagram of first receiver operations 1500 in participating in communications with a sender, wherein the communications includes a congestion control mechanism. First receiver operations 1500 may be indicative of operations occurring in a first communications device serving as a receiver, such as a UE or an information sink, participating with a second communications device serving as a sender. First receiver operations 1500 may occur while the receiver is in a normal operating mode and has data to receive from the sender.

First receiver operations 1500 may begin with the receiver receiving packets from a packet stream originating at the sender (block 1505). The receiver may then determine a source rate of the packet stream from the received packets (block 1506). The receiver may then determine a marking pattern on the packets (block 1507). According to an embodiment, the receiver may examine a value of ECN bits of both the packets that has just arrived as well as previously arrived packets to determine the marking pattern. For example, if the marking pattern is spread over M packets, where M is a positive integer value, then the receiver may examine at least M packets to determine the marking pattern. If out-of-order packet delivery is a concern, then the receiver may examine more than M packets to determine a distribution of different ECN values over the M or more packets to determine the marking pattern. Alternatively, since the receiver implements a full protocol stack, the receiver may be capable of re-ordering the packets prior to determining the marking pattern.

The receiver may then send a signal to the sender based on the marking pattern of the packets from the packet stream (block 1509). The sending of the signal and a nature of the signal itself may also be based on a CODEC source rate of the data in the packets and a set of supported CODEC source rates that have been negotiated between the sender and the receiver during the call setup.

As an example, if the CODEC source rate of the packet stream is at a minimum CODEC source rate in the negotiated set of supported rates and the marking pattern of the packet stream is the first marking pattern (i.e., the rate-reduction-prohibited and the rate-up-allowed pattern), then a signal may be sent to the sender to increase the CODEC source rate of the packet stream. If the CODEC source rate of the packet stream is not at the minimum CODEC source rate in the negotiated set of supported rates and the marking pattern of the packet stream is the third marking pattern (i.e., the rate-reduction-requested pattern), then a signal may be sent to the sender to indicate a congestion condition and the CODEC source rate should be reduced. According to an embodiment, the signal may be in the form of a RTCP ECN feedback message.

As another example, if the CODEC source rate of the packet stream is not at a maximum CODEC source rate in the negotiated set of supported rates and the marking pattern of the packet stream is the second marking pattern, which is a rate-reduction-allowed and rate-up-allowed pattern under some embodiments as described before, then a signal may be sent to the sender to indicate a request to increase the CODEC source rate of the packet stream. First receiver operation 1500 may then terminate.

FIG. 16b illustrates a flow diagram of second receiver operations 1550 in participating in communications with a sender, wherein the communications includes a congestion control mechanism. Second receiver operation 1550 may be indicative of operations occurring in a first communications device serving as a receiver, such as a UE or an information sink, participating with a second communications device serving as a sender. Second receiver operation 1550 may occur while the receiver is in a normal operating mode and has data to receive from the sender.

Second receiver operations 1550 may be an implementation of block 1509, sending a signal to the source of the packet stream. Second receiver operations 1550 may begin with determining a marking pattern of the packets in the packet stream (block 1555). The receiver may then determine if the CODEC source rate of the packet stream is at the minimum CODEC source rate (block 1557). Since the receiver and the sender negotiated the CODEC source rate at initiation of the communications, the receiver knows the CODEC source rate plus a set of possible CODEC source rates (if any).

If the CODEC source rate is not at the minimum CODEC source rate and if the marking pattern of the packets is the third marking pattern (i.e., the rate-reduction-requested pattern) (block 1559), then the receiver may send a signal to the sender to request a reduction in the CODEC source rate (block 1561). Second receiver operations 1550 may then terminate. If the CODEC source rate is at the minimum CODEC source rate or if the marking pattern is not the third marking pattern, then second receiver operations 1550 may then terminate.

Advantageous features of embodiments of the invention may include: A method for providing congestion control at a radio access network using an explicit indication of the capacity for further reducing a source rate of an RTP stream from each of a plurality of senders is provided, the method comprising: determining by a sender whether the source rate of the RTP stream is at the lowest rate within a set of source rates that are negotiated between the sender and a receiver during a call setup; sending a plurality of consecutive real-time protocol (RTP) packets of the RTP stream by the sender by marking the explicit congestion notification (ECN) bits in the Internet Protocol (IP) headers of the plurality of RTP packets of the RTP stream, packet-by-packet, with a first marking pattern when the source rate of the RTP stream is at the lowest rate within the set of negotiated source rates; sending a plurality of consecutive RTP packets of an RTP stream by the sender by marking the ECN bits in the IP headers of the plurality of RTP packets of the RTP stream, packet-by-packet, with a second marking pattern when the source rate of the RTP stream is not at the lowest rate within the set of negotiated source rates; determining whether a congested or un-congested condition is experienced at the radio access network by an enhanced Node B (eNB); receiving the plurality of RTP packets of one or more RTP streams by the eNB from one or more senders; determining the marking pattern on the ECN bits observed on the plurality of currently and previously received RTP packets of each RTP stream by the eNB; forming a group of rate-reduction-allowed streams by the eNB comprising of all the RTP streams of which the RTP packets are received with the second marking pattern on the ECN bits packet-by-packet; selecting one or more RTP streams from the group of rate-reduction-allowed streams by the eNB for reducing the source rate in response to a congested condition experienced at the radio access network; sending the RTP packet of the RTP stream that is selected for reducing the source rate by the eNB by changing the ECT mark on the RTP packet to the CE mark such that the plurality of received RTP packets of the selected RTP stream are sent by the eNB with a third marking pattern on the ECN bits packet-by-packet to indicate the request for reducing the source rate; receiving one or more RTP packets of the RTP stream by the receiver; sending a signal to the sender by the receiver in response to the ECN bits in the IP header of the received RTP packet on the RTP stream according to the information of the source rate and the marking pattern on the ECN bits observed on the received RTP packets on the RTP stream; and changing the source rate of the RTP stream by the sender in response to the signal received from the receiver.

The method could further include, wherein sending a signal to the sender by the receiver in response to the ECN bits in the IP header of the received RTP packet of the RTP stream according to the information of the source rate and the marking pattern observed on the received RTP packets on the RTP stream further comprises of: determining the marking pattern on the ECN bits observed on the currently and previously received RTP packets of the RTP stream by the receiver; determining whether the source rate of the RTP stream of the sender is at the lowest rate within the set of the negotiated source rates by the receiver using the information in the RTP header of the received RTP packet and the information of the set of source rates that are negotiated between the sender and the receiver during the call setup; and sending a real-time control protocol (RTCP) ECN Feedback message by the receiver to indicate the congestion experienced when the receiver determines that the third marking pattern on the ECN bits is observed on the received RTP packets of the RTP stream and the source rate of the RTP stream of the sender is not at the lowest rate within the set of the negotiated source rates, and wherein changing the source rate of the RTP stream by the sender in response to the signal received from the receiver further comprises of reducing the source rate of the RTP stream by the sender in response to the RTCP ECN Feedback message received from the receiver with the indication of congestion experienced.

The method could further include, wherein the first marking pattern alternates between the not-ECN-Capable-Transport (not-ECT) and the ECN-Capable-Transport (ECT) marks on a packet-by-packet basis, the second marking pattern consists of all ECT marks, and the third marking pattern consists of all Congestion Experienced (CE) marks, wherein an ECT mark can be the ECT(0) codepoint "01" or the ECT(1) codepoint "10", the not-ECT mark is the codepoint "00", and the CE mark is the codepoint "11".

The method could further include, wherein the first marking pattern alternates between the CE and the ECT marks on a packet-by-packet basis, the second marking pattern consists of all ECT marks, and the third marking pattern consists of all CE marks, wherein an ECT mark can be the ECT(0) codepoint "01" or the ECT(1) codepoint "10", the not-ECT mark is the codepoint "00", and the CE mark is the codepoint "11".

The method could further include, further comprising: forming a group of rate-up-allowed streams by the eNB comprising of all the RTP streams of which the RTP packets are received with the first marking pattern on the ECN bits packet-by-packet; selecting one or more RTP streams from the group of rate-up-allowed streams by the eNB for increasing the source rate in response to an un-congested condition experienced at the radio access network; sending the RTP packet of the RTP stream that is selected for increasing the source rate by the eNB by keeping the ECN bits in the IP header of the RTP packet as they are received to indicate the request for increasing the source rate; and sending the RTP packet of the RTP stream of which the RTP packets are received with the first marking pattern but is not selected for increasing the source rate in response to the un-congested condition experienced at the radio access network by the eNB by changing the ECT mark on the RTP packet to the CE mark such that the plurality of received RTP packets of the RTP stream are sent by the eNB with a fourth marking pattern on the ECN bits packet-by-packet to indicate the request for keeping the source rate, wherein sending a signal to the sender by the receiver in response to the ECN bits in the IP header of the received RTP packet on the RTP stream according to the information of the source rate and the marking pattern observed on the received RTP packets on the RTP stream further comprises of sending a rate-up-switch signal to the sender by the receiver to indicate a request for increasing the source rate when the receiver determines that the first marking pattern on the ECN bits is observed on the received RTP packets on the RTP stream, and wherein changing the source rate of the RTP stream by the sender in response to the signal sent by the receiver further comprises of increasing the source rate of the RTP stream by the sender in response to the rate-up-switch signal received from the receiver.

The method could further include, wherein the first marking pattern alternates between not-ECT and ECT marks on a packet-by-packet basis, the second marking pattern consists of all ECT marks, the third marking pattern consists of all CE marks, and the fourth marking pattern alternates between the not-ECT and the CE marks on a packet-by-packet basis, wherein an ECT mark can be the ECT(0) codepoint "01" or the ECT(1) codepoint "10", the not-ECT mark is the codepoint "00", and the CE mark is the codepoint "11".

The method could further include, wherein the first marking pattern alternates between the CE and the ECT markings on a packet-by-packet basis, the second marking pattern consists of all ECT marks, both the third and the fourth marking patterns consist of all CE marks, wherein an ECT mark can be the ECT(0) codepoint "01" or the ECT(1) codepoint "10", the not-ECT mark is the codepoint "00", and the CE mark is the codepoint "11".

The method could further include, further comprising: forming the group of rate-reduction-allowed streams by the eNB by further including all the RTP streams of which the RTP packets are received with a fifth marking pattern on the ECN bits packet-by-packet before selecting a stream for reducing the source rate; forming the group of rate-up-allowed streams by the eNB by further including all the RTP streams of which the RTP packets are received with the second marking pattern on the ECN bits packet-by-packet before selecting a stream for increasing the source rate; sending the RTP packet of the RTP stream of which the RTP packets are received with the second marking pattern but is neither selected for increasing the source rate in response to an un-congested condition experienced at the radio access network nor selected for reducing the source rate in response to a congested condition experienced at the radio access network by the eNB by changing the ECT mark on every other received RTP packet of the RTP stream to the CE mark such that the plurality of received RTP packets of the RTP stream are sent by the eNB with the fifth marking pattern on the ECN bits packet-by-packet to indicate the request for keeping the source rate; and sending the RTP packet of the RTP stream of which the RTP packets are received with the fifth marking pattern but is not selected for reducing the source rate in response to the congested condition experienced at the radio access network by the eNB by keeping the ECN bits in the IP header of the RTP packet as they are received to indicate the request for keeping the source rate, wherein sending a signal to the sender by the receiver in response to the ECN bits in the IP header of the received RTP packet on the RTP stream according to the information of the source rate and the marking pattern observed on the received RTP packets on the RTP stream further comprises: determining whether the source rate of the RTP stream is at the highest rate within the set of the negotiated source rates by the receiver using the information in the RTP header of the received RTP packet and the information of the set of source rates that are negotiated between the sender and the receiver during the call setup; and sending a rate-up-switch signal to the sender by the receiver to indicate a request for increasing the source rate when the receiver determines that the second marking pattern on the ECN bits is observed on the received RTP packets on the RTP stream and the source rate of the RTP stream of the sender is not at the highest rate within the set of the negotiated source rates, and wherein the first marking pattern alternates between the not-ECT and the ECT marks on a packet-by-packet basis, the second marking pattern consists of all ECT marks, the third marking pattern consists of all CE marks, the fourth marking pattern alternates between the not-ECT and the CE marks on a packet-by-packet basis, and the fifth marking pattern alternates between the CE and the ECT marks on a packet-by-packet basis, wherein an ECT mark can be the ECT(0) codepoint "01" or the ECT(1) codepoint "10", the not-ECT mark is the codepoint "00", and the CE mark is the codepoint "11".

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

Accordingly, the appended claims are intended to include within their scope such processes, machines, manufacture, compositions of matter, means, methods, or steps.

What is claimed is:

1. A method for operations at a communications device, wherein the communications device is a sender of information packets over a packet stream, the method comprising:
   determining a source rate of the packet stream;
   marking information packets of the packet stream, wherein,
      the information packets are marked with a repeating multi-packet first marking pattern if the source rate is equal to a minimum source rate, wherein the first marking pattern has a period of M information packets, where M is a positive integer value greater than or equal to two, or
      the information packets are marked with a repeating multi-packet second marking pattern if the source rate is greater than the minimum source rate, wherein the second marking pattern has a period of M information packets; and
   transmitting the marked information packets over the packet stream to a receiver.

2. The method of claim 1, wherein marking information packets of the packet stream comprises setting two or more bits in each information packet to a value based on a marking pattern.

3. The method of claim 2, wherein the two or more bits in each information packet comprise explicit congestion notification (ECN) bits.

4. The method of claim 3, wherein there are two ECN bits per information packet.

5. The method of claim 4, wherein M is equal to two, and wherein the first marking pattern comprises a first packet with two ECN bits set to a not-ECN-capable-transport (Not-ECT) codepoint and a second packet with two ECN bits set to an ECN-capable-transport (ECT) codepoint.

6. The method of claim 5, wherein the Not-ECT codepoint is a binary value "00" and the ECT codepoint is a binary value "10" or a binary value "01".

7. The method of claim 6, wherein the two ECN bits of the second packet are randomly set to either the binary value "10" or the binary value "01".

8. The method of claim 4, wherein M is equal to two, and wherein the second marking pattern comprises a first packet with two ECN bits set to an ECN-capable-transport (ECT) codepoint and a second packet with two ECN bits set to the ECT codepoint.

9. The method of claim 1, further comprising:
   receiving a signal from the receiver, wherein the signal comprises a request to change the source rate of the packet stream; and
   changing the source rate of the packet stream based upon the request.

10. The method of claim 9, wherein the signal comprises a modified real-time transport protocol control protocol (RTCP) Receiver Report (RR) message, a new RTCP ECN Feedback message, a codec mode request (CMR) field of an adaptive multi-rate (AMR) or AMR-wideband (AMR-WB) Codec based packet, or a combination thereof.

11. A method for operations at a communications controller, the method comprising:
   receiving information packets from a packet stream;
   determining congestion conditions at the communications controller;
   determining a repeating multi-packet marking pattern for the packet stream;
   determining if the repeating multi-packet marking pattern is equal to a rate-reduction-allowed marking pattern, wherein the rate-reduction-allowed marking pattern has a period of M information packets, where M is a positive integer value greater than or equal to two;
   if the communications controller is not experiencing congestion, transmitting the information packets over the packet stream to the receiver;
   if the communications controller is experiencing congestion and the marking pattern is not equal to the rate-reduction-allowed marking pattern, transmitting the information packets over the packet stream to a receiver; and
   if the communications controller is experiencing congestion and the marking pattern is equal to the rate-reduction-allowed marking pattern,
      marking at least one packet stream marked with the rate-reduction-allowed marking pattern with a rate-reduction-requested marking pattern, and
      transmitting information packets of the at least one packet stream marked with the rate-reduction requested marking pattern to the at least one packet stream's receiver.

12. The method of claim 11, wherein marking at least one packet stream comprises:
   forming a group comprising packet streams marked with the rate-reduction-allowed marking pattern;
   selecting at least one packet stream from the group; and
   marking information packets of the selected at least one packet stream with the rate-reduction-requested marking pattern.

13. The method of claim 12, wherein M is equal to two, and wherein the rate-reduction-requested marking pattern comprises a first packet with two explicit congestion notification (ECN) bits set to a congestion experienced (CE) codepoint and a second packet with two ECN bits set to the CE codepoint.

14. The method of claim 11, further comprising:
   determining if the marking pattern is equal to a rate-up-allowed marking pattern, wherein the rate-up-allowed marking pattern has a period of M information packets;
   if the marking pattern is not equal to the rate-up-allowed marking pattern, transmitting the information packets over the packet stream to the receiver; and
   if the marking pattern is equal to the rate-up-allowed marking pattern and if the communications controller is not experiencing congestion,
      forming a group of rate-up-allowed packet streams,
      selecting at least one packet stream from the group of rate-up-allowed packet streams,
      marking the information packets of unselected packet streams of the group of rate-up-allowed packet streams with a rate-up-prohibited marking pattern, and
      transmitting the information packets of the group of rate-up-allowed packet streams to each information packet's receiver.

15. The method of claim 14, wherein M is equal to two, and wherein the rate-up-prohibited marking pattern comprises a first packet with two explicit congestion notification (ECN) bits set to a not-ECN-capable-transport (Not-ECT) codepoint and a second packet with two ECN bits set to a congestion experienced (CE) codepoint.

16. The method of claim 14, wherein M is equal to two, and wherein the rate-up-prohibited marking pattern comprises a first packet with two explicit congestion notification (ECN)

bits set to a congestion experienced (CE) codepoint and a second packet with two ECN bits set to a ECN-capable-transport (ECT) codepoint.

17. The method of claim 14, further comprising:
determining if the marking pattern is equal to a rate-up-prohibited marking pattern, wherein the rate-up-prohibited marking pattern has a period of M information packets;
determining if the marking pattern is equal to a rate-up-allowed and rate-reduction-allowed marking pattern, wherein the rate-up-allowed and rate-reduction-allowed marking pattern has a period of M information packets;
prior to marking at least one packet stream with the rate-reduction-allowed marking pattern with a rate-reduction-requested marking pattern, adding packet streams marked with the rate-up-prohibited marking pattern to a group comprising packet streams marked with the rate-reduction-allowed marking pattern;
prior to selecting at least one packet stream from the group of rate-up-allowed packet streams, adding packet streams marked with the rate-up-allowed and rate-reduction-allowed marking pattern to the group of rate-up-allowed packet streams;
transmitting information packets of a first unselected packet stream marked with the rate-up-allowed and rate-reduction-allowed marking pattern to its receiver, wherein the first unselected packet stream was neither selected for increasing its source rate nor selected for decreasing its source rate; and
transmitting information packets of a second unselected packet stream marked with the rate-up-allowed and rate-reduction-allowed marking pattern to its receiver, wherein the second unselected packet stream was not selected for reducing its source rate.

18. The method of claim 11, wherein determining a marking pattern comprises examining ECN bits of M consecutively numbered packets.

19. The method of claim 11, wherein determining a marking pattern comprises:
examining ECN bits of at least M consecutive packets to generate a distribution of codepoints; and
determining the marking pattern from the distribution of codepoints.

20. A method for operations at a communications device, wherein the communications device is a receiver of information packets over a packet stream, the method comprising:
receiving information packets from a packet stream;
determining a source rate of the packet stream from the received information packets;
determining a repeating multi-packet marking pattern of the packet stream, wherein the marking pattern has a period of M information packets, where M is a positive integer value greater than or equal to two; and
transmitting a signal to a source of the information packets, wherein the signal is based on the marking pattern of the packet stream and the source rate of the packet stream.

21. The method of claim 20, wherein determining a marking pattern comprises examining explicit congestion notification (ECN) bits of M consecutively numbered packets.

22. The method of claim 20, wherein determining a marking pattern comprises:
examining ECN bits of at least M consecutive packets to generate a distribution of codepoints; and
determining the marking pattern from the distribution of codepoints.

23. The method of claim 20, wherein transmitting a signal comprises sending the signal in response to determining that the marking pattern is a rate-reduction-requested marking pattern and that the source rate of the packet stream is not at a minimum source rate.

24. The method of claim 23, wherein the signal comprises a modified real-time transport protocol control protocol (RTCP) Receiver Report (RR) message, a new RTCP ECN Feedback message, a codec mode request (CMR) field of an adaptive multi-rate (AMR) or AMR-wideband (AMR-WB) Codec based packet, or a combination thereof.

25. The method of claim 20, wherein transmitting a signal comprises sending the signal in response to determining that the marking pattern is a rate-reduction-prohibited and rate-up-allowed marking pattern.

26. The method of claim 20, wherein transmitting a signal comprises sending the signal in response to determining that the marking pattern is rate-reduction-allowed and rate-up-allowed marking pattern and that the source rate of the packet stream is not at a maximum source rate.

* * * * *